(12) United States Patent
Endo et al.

(10) Patent No.: US 7,261,670 B2
(45) Date of Patent: Aug. 28, 2007

(54) CONTROL DEVICE OF HYBRID DRIVE UNIT

(75) Inventors: Hiroatsu Endo, Toyota (JP); Tatsuya Ozeki, Toyota (JP); Masataka Sugiyama, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 227 days.

(21) Appl. No.: 11/166,644

(22) Filed: Jun. 27, 2005

(65) Prior Publication Data

US 2005/0288147 A1   Dec. 29, 2005

Related U.S. Application Data

(63) Continuation of application No. PCT/JP03/16046, filed on Dec. 25, 2003.

(30) Foreign Application Priority Data

Dec. 25, 2002  (JP) .............................. 2002-374973
Dec. 25, 2002  (JP) .............................. 2002-374975
Dec. 25, 2002  (JP) .............................. 2002-374978

(51) Int. Cl.
  *B60K 1/02* (2006.01)
(52) U.S. Cl. ........................................................ 477/3
(58) Field of Classification Search .................... 477/3; 701/59; 180/65.7, 65.8
  See application file for complete search history.

(56) References Cited

U.S. PATENT DOCUMENTS

| | | | |
|---|---|---|---|
| 5,088,354 A | 2/1992 | Asada | |
| 5,307,711 A | 5/1994 | Kimura et al. | |
| 5,833,570 A * | 11/1998 | Tabata et al. .................. | 477/3 |
| 5,842,534 A | 12/1998 | Frank | |
| 5,895,333 A | 4/1999 | Morisawa et al. | |
| 6,159,127 A | 12/2000 | Loeffler et al. | |
| 6,193,628 B1 * | 2/2001 | Hrovat et al. .................. | 477/3 |
| 6,203,468 B1 | 3/2001 | Nitta et al. | |
| 6,371,878 B1 | 4/2002 | Bowen | |
| 6,430,483 B2 | 8/2002 | Takaoka et al. | |
| 6,524,215 B1 * | 2/2003 | Schmidt ......................... | 477/3 |
| 6,558,287 B2 | 5/2003 | Hayabuchi et al. | |
| 6,602,164 B2 * | 8/2003 | Yoshiaki et al. ............. | 477/107 |
| 6,634,986 B2 * | 10/2003 | Kima ........................... | 477/107 |
| 6,740,002 B1 | 5/2004 | Stridsberg | |
| 2004/0084233 A1 | 5/2004 | Wakuta et al. | |
| 2004/0192494 A1 | 9/2004 | Ozeki et al. | |
| 2004/0220015 A1 | 11/2004 | Murakami et al. | |
| 2004/0249524 A1 | 12/2004 | Ozeki et al. | |
| 2004/0254046 A1 | 12/2004 | Ozeki et al. | |

(Continued)

FOREIGN PATENT DOCUMENTS

DE   197 12 246 A1   11/1997

(Continued)

*Primary Examiner*—Dirk Wright
(74) *Attorney, Agent, or Firm*—Oblon, Spivak, McClelland, Maier & Neustadt, P.C.

(57) ABSTRACT

A control device of a hybrid drive unit, wherein an assist prime mover is connected through a transmission to an output member, to which a torque outputted by a main prime mover is transmitted. The control device comprises a first torque correcting means for correcting the torque to be transmitted from the main prime mover to the output member during a gear shift by the transmission.

46 Claims, 17 Drawing Sheets

U.S. PATENT DOCUMENTS

2004/0259680 A1    12/2004    Ozeki et al.
2005/0233856 A1*    10/2005    Endo ........................ 477/93
2006/0196711 A1*    9/2006    Endo ........................ 180/65.3

FOREIGN PATENT DOCUMENTS

| | | |
|---|---|---|
| DE | 198 49 156 A1 | 9/1999 |
| DE | 100 08 344 A1 | 8/2000 |
| DE | 101 22 713 A1 | 2/2002 |
| DE | 201 17 410 U1 | 3/2002 |
| DE | 100 58 020 A1 | 5/2002 |
| DE | 101 53 476 A1 | 5/2002 |
| EP | 0 641 684 A1 | 3/1995 |
| EP | 1 122 111 A2 | 8/2001 |
| EP | 1 236 603 A2 | 9/2002 |
| GB | 2 346 123 A | 8/2000 |
| JP | 06-319210 | 11/1994 |
| JP | 09-308008 | 11/1997 |
| JP | 09-322307 | 12/1997 |
| JP | 9-331602 | 12/1997 |
| JP | 10-4606 | 1/1998 |
| JP | 10-023607 | 1/1998 |
| JP | 10-341503 | 12/1998 |
| JP | 2926959 | 5/1999 |
| JP | 2000-220731 | 8/2000 |
| JP | 2000-295709 | 10/2000 |
| JP | 2000-308206 | 11/2000 |
| JP | 2001-112113 | 4/2001 |
| JP | 2001-153218 | 6/2001 |
| JP | 2001-315552 | 11/2001 |
| JP | 2002-142303 | 5/2002 |
| JP | 2002-225578 | 8/2002 |
| JP | 2002-262409 | 9/2002 |
| WO | WO98/31559 | 7/1998 |
| WO | WO 02/06072 A1 | 1/2002 |

* cited by examiner

FIG.17
(A)
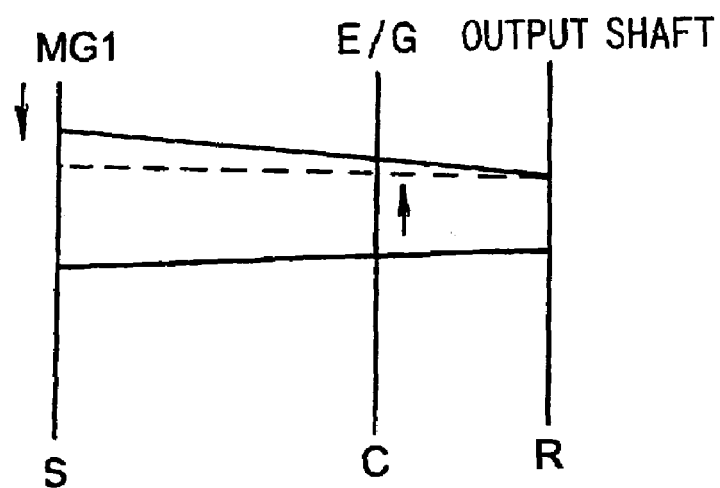
(B)
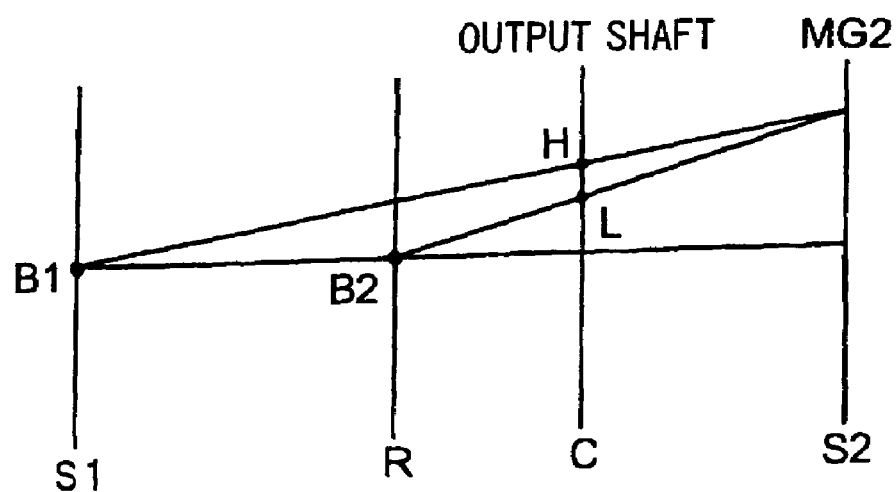

CONTROL DEVICE OF HYBRID DRIVE UNIT

CROSS REFERENCE TO RELATED APPLICATIONS

This application is a continuation under 35 U.S.C. §120 of application Ser. No. PCT/JP03/16046, filed Dec. 25, 2003 and is also based upon and claims priority under 35 U.S.C. §119 from Japanese Patent Application Nos. 2002-374973, filed Dec. 25, 2002, 2002-374975, filed Dec. 25, 2002, and 2002-374978, filed Dec. 25, 2002, the entire contents of each of which are incorporated herein by reference.

FIELD OF THE INVENTION

This invention relates to a hybrid drive unit provided with two kinds of prime movers as a power source for driving a vehicle, and more particularly, to a control device for a hybrid drive unit, wherein an assist prime mover is connected through a transmission to an output member, to which a torque is transmitted from a main prime mover.

BACKGROUND OF THE INVENTION

In a vehicular hybrid drive unit, an internal combustion engine such as a gasoline engine or a Diesel engine and an electric device such as a motor generator are generally used as prime movers. The modes of combination of those internal combustion engine and electric device are various, and the number of electric devices to be used is not limited to one but may be plural. In JP-A-2002-225578, for example, there is described the hybrid drive unit, in which an engine and a first motor generator are connected to each other through a synthesizing/distributing mechanism composed of a single pinion type planetary gear mechanism so that a torque is transmitted from the synthesizing/distributing mechanism to an output member, and in which a second motor generator is connected to the output member through a gear shift mechanism so that the output torque of the second motor generator is added as the so-called "assist torque" to the output member. Moreover, the gear shift mechanism is constructed of a planetary gear mechanism capable of being interchanged between two stages of high and low, i.e., a directly connected state and a decelerating state. In the directly connected state, the torque of the second motor generator is applied as it is to the output member. In the decelerating state, on the other hand, the torque of the second motor generator is raised and applied to the output member.

In the aforementioned hybrid drive unit, the second motor generator is controlled into a power mode or a regenerative mode so that a positive torque or a negative torque can be applied to the output member. Moreover, a deceleration state can be set by the transmission so that the second motor generator can be changed into a low torque type or a small size type.

Here, in JP-A-2000-295709, there is described a device, in which first and second motor generators are arranged on the upstream side (or the engine side) of a transmission capable of being switched to high and low modes, so that the gear shifting time may be made substantially constant by controlling the torques of the individual motor generators at the shifting time of the transmission.

When a gear shift of that device is executed by a claw clutch, an additional torque corresponding to a dragging torque is determined and is applied by the electric motor so that the speed of the clutch may quickly reach a synchronous speed.

In JP-A-6-319210, on the other hand, there is described a device, in which the output torque of an engine is transmitted to a predetermined input member of a transmission, and a motor generator is connected to the input member so that the motor generator is controlled to smoothen the output torque, i.e., to absorb an inertial torque at a shifting time.

In Japanese Patent No. 2926959, moreover, there is described a device, in which the output of a power generating source is changed into a drive state or a driven state, when the drive state or the driven state cannot be clearly decided, and a gear shift is then executed.

In JP-A-6-319210, moreover, there is described a device, in which a motor torque is lowered at an inertia phase or at its final stage to absorb an inertia torque so as to reduce the shocks at the shifting time of a transmission assembled in a hybrid drive unit.

In JP-A-9-32237, on the other hand, there is disclosed a hybrid drive unit having a transmission, in which the initial oil pressure of a frictional engagement device to participate in the gear shift of the transmission is learned on the basis of a torque correction amount of a motor for inputting a torque to the transmission.

According to the device described in JP-A-2002-225578, the torque outputted from the main prime mover composed of the engine and the first motor generator is transmitted to the output member, whereas the torque outputted from the second motor generator can be transmitted to the output member. Therefore, the engine constructing the main prime mover is run for the optimum fuel consumption so that the short or excessive torque for the drive force demanded in that state can be supplemented by the second motor generator. Moreover, the device is provided with the transmission so that the torque of the second motor generator can be raised and transmitted to the output member. As a result, the second motor generator can be made to have a small size or a low capacity.

The aforementioned device has such advantages, but shocks may occur in case the gear shifting operation is done by the transmission. Specifically, the rotating speed of any rotary member is changed by the gear shift so that an inertia torque is established by the change in the rotating speed and affects the output torque. This change in the output torque may appear as the shocks. In case the gear shift is executed by applying or releasing the frictional engagement device, moreover, the torque capacity of the frictional engagement device transiently lowers to restrict the torque which can be assisted by the second motor generator. As a result, the entire output torque of the hybrid drive unit or the drive torque of the vehicle may change during the gear shift thereby to cause the shocks.

On the other hand, the transmission in the hybrid drive unit, as described in JP-A-2002-225578, is constructed to shift the gears at two stages of low (or low gear stage) and high (or direct stage) stages by a brake and clutch. At the shifting time, therefore, one of the brake and the clutch is released whereas the other is applied so that both have to be coordinately controlled. This control has a tendency to elongate the time period necessary for the gear shift. During this gear shift, moreover, the transmission torque capacity by the transmission is reduced. Therefore, the fall in the output shaft torque may be deepened not only by that reduced torque capacity but also by the long shifting time period.

In the aforementioned device described in JP-A-2002-225578, in the gear shift of the case where the so-called "torque assist" is done by the second motor generator, for example, the torque capacity in the transmission, i.e., the torque capacity of the frictional engagement device to participate in the gear shift exerts influences on the output shaft torque. In case the torque to be transmitted from the internal combustion engine to the output shaft by controlling the first motor generator is controlled at the shifting time, moreover, it is necessary to control the torque of the first motor generator according to the torque capacity in the transmission.

However, the relation between the apply pressure and the torque capacity of the frictional engagement device such as the clutch or the brake is not constant due to the individual difference or the aging so that the torque to appear on the output shaft at the shifting time may become different from the expected one to deteriorate the shocks. In case the so-called "torque assist" at the shifting time is done by the electric motor such as the motor generator in the hybrid drive unit, on the other hand, the torque of the electric motor may become different from the needed one. As a result, the output shaft torque may become short or excessive to cause the shocks.

The aforementioned invention, as described in JP-A-9-32237, is constructed such that the advancing velocity of the gear shift is controlled by the motor torque so that the initial apply pressure is learned on the basis of the motor torque. Therefore, it is possible to learn the initial apply pressure for optimizing the change in the speed at the shifting time, but it is impossible to precisely determine the relation between the torque capacity and the apply pressure of the frictional engagement device to participate in the gear shift.

SUMMARY OF THE INVENTION

An object of this invention is to provide a control device for a hybrid drive unit, which can eliminate shocks, as might otherwise be caused by a gear shift in a transmission having an output member connected to an assist prime mover.

Another object of this invention is to provide a control device, which can suppress or prevent such fluctuation or fall of the torque of the output member, as might otherwise accompany the gear shift in the transmission having the output member connected to an electric motor.

Still another object of this invention is to provide a control device, which can suppress or prevent the shocks by controlling the transmission to accurately grasp the relation between a torque capacity and an apply pressure of a frictional engagement devise.

In order to achieve the above-specified objects, this invention is characterized by the construction, in which the excessiveness and shortage of the output torque of the case where the transmission of the torque between the assist prime mover and the output member is restricted by the gear shift. According to this invention, more specifically, there is provided a control device of a hybrid drive unit, wherein an assist prime mover is connected through a transmission to an output member, to which a torque outputted by a main prime mover is transmitted. The control device is characterized by comprising a first torque correcting means (or corrector) for correcting or amending the torque to be transmitted from the main prime mover to the output member during a gear shift by the transmission.

The first torque correcting means can be constructed to raise the torque to be transmitted from the main prime mover to the output member.

In this invention, therefore, there is transmitted to the output member through the transmission not only the torque from the main prime mover but also the positive torque or the negative torque from the assist prime mover. In the case of a gear shift in the transmission, the transmission torque between the assist prime mover and the output member falls so that the torque of the main prime mover is corrected according to the fall of the transmission torque. As a result, the fluctuation of the torque of the output member is suppressed to prevent or avoid the shocks.

In this invention, moreover, the main prime mover can include: an internal combustion engine, to which the torque is synthesized or distributed through a gear mechanism for performing a differential action with three rotary elements; and a first motor generator. The assist prime mover can be constructed of a second motor generator. The first torque correcting means can be constructed to correct the torque by the first motor generator.

In this invention, therefore, when the gear shift is executed by the transmission, the torque of the first motor generator is corrected, and the torque of the output member is corrected by the torque change including the inertia torque according to the accompanying rotation change. As a result, even if the torque to be transmitted between the second motor generator and the output member changes, the torque change of the output member is prevented or suppressed to prevent or avoid the shocks.

In this invention, still moreover, the aforementioned invention can further comprise a second torque correcting means (or corrector) for correcting or amending the torque of the internal combustion engine when the torque of the first motor generator is corrected during the gear shift.

The second torque corrector can be constructed to raise the torque of the internal combustion engine.

In this invention thus constructed, therefore in case the torque of the first motor generator is corrected during the gear shift, the torque of the internal combustion engine is additionally corrected. Even if either the torque of the first motor generator to act on the internal combustion engine through the gear mechanism or the reaction based on the torque changes, therefore, it is possible to prevent or suppress the change in the speed of the internal combustion engine.

In this invention, moreover, the first torque correcting means can be constructed to correct the torque of the first motor generator in case the running state of the internal combustion engine is in such a region that the output torque of the internal combustion engine falls as the speed of the internal combustion engine increases.

In this invention, therefore, the torque of the first motor generator is corrected according to the gear shift so that the speed of the internal combustion engine accordingly drops. Simultaneously as the inertia torque accompanying the speed change occurs, the torque to be outputted by the internal combustion engine itself rises. As a result, the control is facilitated to prevent or suppress the torque change of the output member accompanying the gear shift in the transmission.

In this invention of any of the aforementioned constructions, moreover, the transmission can be constructed to include a frictional engagement device for transmitting the torque of the assist prime mover to the output member and for executing a gear shift when applied or released, and the first torque correcting means can be constructed to correct the torque to be transmitted from the main prime mover to the output member on the basis of the torque capacity of the frictional engagement device.

In this invention, therefore, the gear shift in the transmission is executed by applying or releasing the frictional engagement device. In this transient state, the torque capacity of the frictional engagement device becomes small to reduce the torque to be transmitted between the assist prime mover and the output member, but the torque to be transmitted from the main prime mover to the output member is corrected on the basis of the torque capacity of the frictional engagement device so that the change in the torque of the output member is prevented or suppressed. As a result, the shocks are prevented or avoided.

In this invention, still moreover, the frictional engagement device can be constructed to include a low speed side frictional engagement device to be released at the time of the gear shift, in which the assist prime mover outputs the torque and reduces a gear ratio, and the first torque correcting means can be constructed to correct the torque to be transmitted from the main prime mover to the output member on the basis of a feedback correction amount to feedback-control the apply pressure of the low speed side frictional engagement device so that the speed of the assist prime mover may be a speed set by a predetermined fine slide of the low speed side frictional engagement device.

In this invention, therefore, in the case of the so-called "power-on upshift" in the transmission, the frictional engagement device on the low speed side is released, and the apply pressure of the frictional engagement device is so feedback-controlled that the speed of the assist prime mover may be one to be set in the slightly sliding state of the frictional engagement device. And, the torque to be transmitted from the main prime mover to the output member is corrected on the basis of the feedback correction amount. As a result, the influence of the dispersion in the characteristics of the frictional engagement device is reduced to improve the precision of the torque fluctuation suppressing control of the output member, i.e., the suppressing control of the shifting shocks.

In this invention of any of the aforementioned constructions, still moreover, the transmission can be constructed to include a frictional engagement device for transmitting the torque of the assist prime mover to the output member and for executing a gear shift when applied or released, and the first torque correcting means can be constructed to correct the torque to be transmitted from the main prime mover to the output member on the basis of a deviation between the torque of the output member, as estimated on the basis of the torque capacity of the frictional engagement device during a gear shift, and a target output torque.

In this invention, therefore, the torque of the output member is estimated on the basis of the torque capacity of the frictional engagement device for executing the gear shift in the transmission, and the deviation between the estimated output torque and the target output torque is determined so that the torque to be transmitted from the main prime mover to the output member is corrected on the basis of that deviation. As a result, the output torque during the gear shift is kept at the target torque so that the shocks accompanying the gear shift in the transmission are prevented or avoided.

In this invention, on the other hand, this invention, the first torque correcting means can be constructed to correct the torque to be transmitted from the main prime mover to the output member on the basis of the proceeding degree of a gear shift after the start of an inertia phase at the gear shift.

In this invention, therefore, after the inertia phase by the gear shift in the transmission was started, the torque to be transmitted from the main prime mover to the output member is corrected on the basis of the progressing state of the gear shift such as the degree of the rotational change. Therefore, the torque to be transmitted from the main prime mover to the output member can be precisely corrected to prevent or reduce the shocks. In case the gear shift proceeds to some extent and arrives at the shift ending time, moreover, it is possible to control the torque correction on the basis of that fact, and it is easy to control the torque correction of the main prime mover.

In this invention, still moreover, the first torque correcting means can be constructed to correct the torque to be transmitted from the main prime mover to the output member on the basis of a learned value of a time period from the shifting start at the time of a gear shift to reduce the gear ratio of the transmission, while the assist prime mover is outputting the torque, to the start of an inertia phase.

In this invention, therefore, the time period from the shifting start of the so-called "power-on upshift" to the start of the inertia phase is learned, and the torque to be transmitted from the main prime mover to the output member is corrected on the basis of the learned value. Therefore, the timing and/or the amount of the correction of the torque to be transmitted from the main prime mover to the output member accompanying the gear shift can be optimized to prevent or avoid the shocks accompanying the gear shift precisely.

In this invention, moreover, the first torque correcting means can be constructed to correct the torque to be transmitted from the main prime mover to the output member on the basis of a learned value of a time period from the inertia phase start at the time of a gear shift to reduce the gear ratio of the transmission, while the assist prime mover is outputting the torque, to the shifting end.

In this invention, therefore, the time period from the inertia phase start in the gear shift of the so-called "power-on upshift" to the shift end is learned, and the torque to be transmitted from the main prime mover to the output member is corrected on the basis of the learned value. Therefore, the timing and/or the amount of the correction of the torque to be transmitted from the main prime mover to the output member accompanying the gear shift can be optimized to prevent or avoid the shocks accompanying the gear shift precisely. In case the gear shift proceeds to some extent and arrives at the shift ending time, moreover, it is possible to control the torque correction on the basis of that fact, and it is easily to control the torque correction of the main prime mover.

In this invention, still moreover, the second torque correcting means can be constructed to correct the torque of the internal combustion engine on the basis of the torque correction amount of the first motor generator during the gear shift.

In this invention, therefore, the torque of the internal combustion engine is corrected on the basis of the torque correction amount of the first motor generator during the gear shift. Therefore, the torque of the internal combustion engine connected thereto through the gear mechanism is controlled to a proper value according to the torque of the first motor generator. As a result, the precision of the correction control of the torque of the output member is improved to prevent or avoid the shocks and to suppress or avoid the change in the speed of the internal combustion engine.

In this invention, moreover, the transmission can be constructed a gear shift mechanism, and there can be further comprised a gear shift inhibiting means (or inhibitor) for inhibiting the gear shift, in which a torque change for the tooth surfaces of gears in the gear shift mechanism to contact/leave each other is caused, while the torque of the output member is substantially zero.

In this invention, therefore, the state where the torque appearing in the output member is substantially zero, the gear shift for the torque acting on the transmission to change positively and negatively, that is, the gear shift for the tooth surfaces of the gears to contact/leave is inhibited. As a result, it is possible to avoid the so-called "rattling noises", as might otherwise occur in the transmission.

In this invention, moreover, a correcting means (or corrector) for correcting or amending the output torque of the assist prime mover can be comprised in addition to the correcting means for correcting the output torque of the main prime mover.

In this invention, therefore, even if the transmission torque capacity of the transmission changes according to the gear shift in the transmission, the torque of the assist prime mover connected to the input side of the transmission is corrected to compensate the change of the torque in the output member. As a result, the fluctuation or fall of the torque in the output member is prevented or suppressed.

In this invention, in case the output torque of the assist prime mover is to be corrected at the gear shift in the transmission, the relation between the torque capacity and the apply pressure of the frictional engagement device constructing the transmission can be learned to make the shifting control on the basis of the learned result.

With this construction, it is possible to prevent the shifting shocks more effectively.

Furthermore, this invention is a controlling method of the hybrid drive unit for executing aforementioned individual control.

BRIEF DESCRIPTION OF THE DRAWINGS

FIG. 2 is made.

FIG. 17 is a nomographic diagram on the individual planetary gear mechanism shown in FIG. 16.

DETAILED DESCRIPTION OF THE INVENTION

Figure 15:
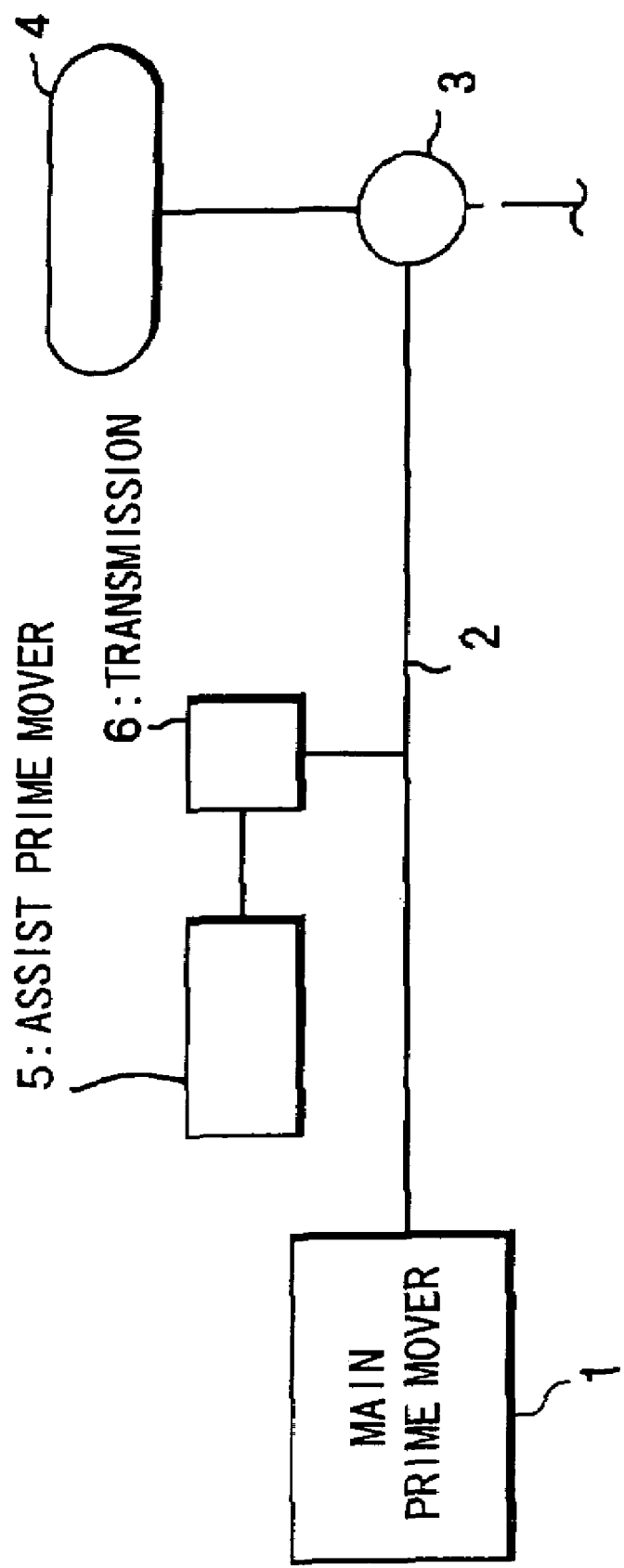
FIG. 15 is a block diagram schematically showing one example of a hybrid drive unit, to which this invention is applied.

This invention will be described in connection with its specific examples. The first description is made on a hybrid drive unit, to which is this invention is applied. The hybrid drive unit or an application target of this invention is mounted on a vehicle, for example. As shown in FIG. 15, the torque of a main prime mover 1 is transmitted to an output member 2, from which the torque is transmitted through a differential 3 to drive wheels 4. On the other hand, there is provided an assist prime mover 5, which can make a power control to output a driving force for a drive and a regenerative control to recover energy. This assist prime mover 5 is connected through a transmission 6 to the output member 2. Between the assist prime mover 5 and the output member 2, therefore, the transmission torque capacity is increased/decreased according to a gear ratio to be set by the transmission 6.

This transmission 6 can be constructed to set the gear ratio at "1" or higher. With this construction, at the power running time for the assist prime mover 5 to output the torque, this torque can be outputted to the output member 2 so that the assist prime mover 5 can be made to have a low capacity or a small size. However, it is preferred that the running efficiency of the assist prime mover 5 is kept in a satisfactory state. In case the speed of the output member 2 rises according to the vehicle speed, for example, the gear ratio is lowered to decrease the speed of the assist prime mover 5. In case the speed of the output member 2 drops, on the other hand, the gear ratio may be raised.

In this gear shifting case, the transmission torque capacity in the transmission 6 may drop, or an inertia torque may occur according to the change in the speed. This affects the torque of the output member 2, i.e., the drive torque adversely. In the control system of this invention, therefore, at a shifting time by the transmission 6, the torque of the main prime mover 1 is corrected to prevent or suppress the torque fluctuation of the output member 2.

Figure 16:
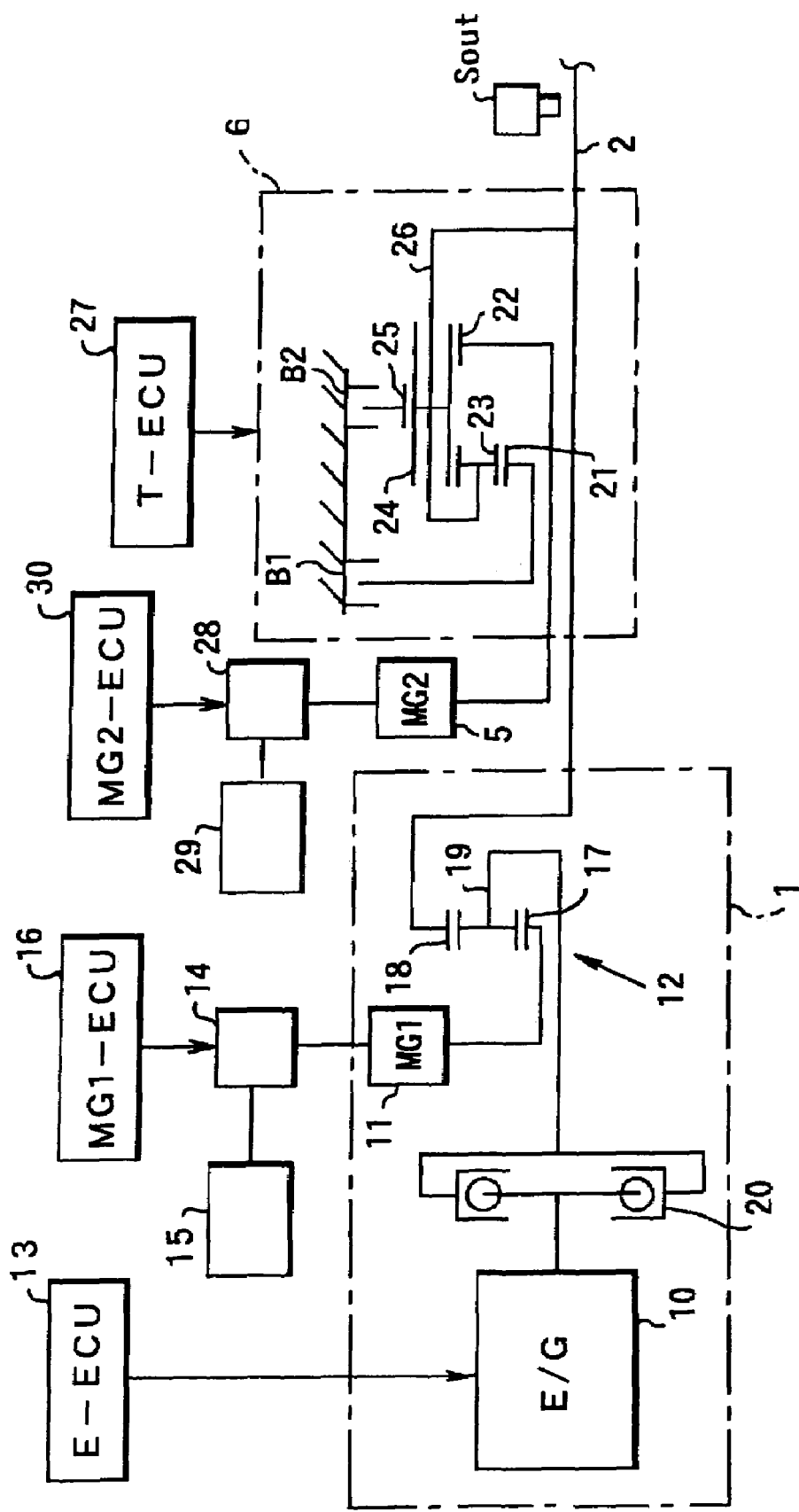
FIG. 16 is a skeleton diagram showing the hybrid drive unit more specifically.

As shown in FIG. 16, more specifically, the main prime mover 1 is mainly constructed to include an internal combustion engine 10, a motor generator (as will be tentatively called the "first motor generator" or "MG 1") 11, and a planetary gear mechanism 12 for synthesizing or distributing the torque between those internal combustion engine 10 and first motor generator 11. The internal combustion engine (as will be called the "engine") 10 is a well-known power unit such as a gasoline engine or a Diesel engine for outputting a power by burning a fuel, and is so constructed that its running state such as the degree of throttle opening (or the air intake amount), the fuel feed amount or the ignition timing can be electrically controlled. This control is made by an electronic control unit (E-ECU) 13 composed mainly of a microcomputer, for example.

On the other hand, the first motor generator 11 is exemplified by a synchronous electric motor and is constructed to function as an electric motor and a dynamo. The first motor generator 11 is connected through an inverter 14 with an accumulator device 15 such as a battery. By controlling the inverter 14, moreover, the output torque or the regenerative torque of the first motor generator 11 is suitably set. For this control, there is provided an electronic control unit (MG1-ECU) 16, which is composed mainly of a microcomputer.

Moreover, the planetary gear mechanism 12 is a well-known one for establishing a differential action with three rotary elements: a sun gear 17 or an external gear; a ring gear 18 or an internal gear arranged concentrically with the sun gear 17; and a carrier 19 holding a pinion gear meshing with those sun gear 17 and ring gear 18 such that the pinion gear may rotate on its axis and revolve around the carrier 19. The internal combustion engine 10 has its output shaft connected through a damper 20 to that carrier 19. In other words, the carrier 19 acts as an input element.

On the other hand, the first motor generator 11 is connected to the sun gear 17. Therefore, this sun gear 17 is the so-called "reaction element", and the ring gear 18 is the output element. And, this ring gear 18 is connected to the output member (i.e., the output shaft) 2.

In the example shown in FIG. 16, on the other hand, the transmission 6 is constructed of one set of Ravignaux type planetary gear mechanisms. These planetary gear mechanisms are individually provided with external gears, i.e., a first sun gear (S1) 21 and a second sun gear (S2), of which the first sun gear 21 meshes with a short pinion 23, which meshes with an axially longer long pinion 24, which meshes with a ring gear (R) 25 arranged concentrically with the individual sun gears 21 and 22. Here, the individual pinions 23 and 24 are so held by a carrier (C) 26 as to rotate on their axes and to revolve around the carrier 26. Moreover, the second sun gear 22 meshes with the long pinion 24. Thus, the first sun gear 21 and the ring gear 25 construct a mechanism corresponding to a double-pinion type planetary gear mechanism together with the individual pinions 23 and 24, and the second sun gear 22 and the ring gear 25 construct a mechanism corresponding to a single pinion type planetary gear mechanism together with the long pinion 24.

There are also provided a first brake B1 for fixing the first sun gear 21 selectively, and a second brake B2 for fixing the ring gear 25 selectively. These brakes B1 and B2 are the so-called "frictional engagement devices" for establishing braking forces by frictional forces, and can adopt a multi-disc engagement device or a band type engagement device. The brakes B1 and B2 are constructed to change their torque capacities continuously according to the engaging forces of oil pressures or electromagnetic forces. Moreover, the aforementioned assist prime mover 5 is connected to the second sun gear 22, and the carrier 26 is connected to the output shaft 2.

In the transmission 6 thus far described, therefore, the second sun gear 22 is the so-called "input element", and the carrier 26 is the output element. The transmission 6 is constructed to set high gear stages of gear ratios higher than "1" by applying the first brake B1, and to set low gear stages of gear ratios higher than those of the high gear stages by applying the second brake B2 in place of the first brake B1. The shifting operations between those individual gear stages are executed on the basis of a running state such as a vehicle speed or a drive demand (or the degree of accelerator opening). More specifically, the shifting operations are controlled by predetermining gear stage regions as a map (or a shifting diagram) and by setting any of the gear stages according to the detected running state. For these controls, there is provided an electronic control unit (T-ECU) 27, which is composed mainly of a microcomputer.

Here in the example shown in FIG. 16, there is adopted as the assist prime mover 5 a motor generator (as will be tentatively called the "second motor generator" or "MG2"), which can have the power mode to output the torque and the regenerative mode to recover the energy. This second motor generator 5 is connected through an inverter 28 with a battery 29. Moreover, the motor generator 5 is constructed to control the power mode, the regenerative mode and the torques in the individual modes by controlling the inverter 28 with an electronic control unit (MG2-ECU) 30 composed mainly of a microcomputer. Here, the battery 29 and the electronic control unit 30 can also be integrated with the inverter 14 and the battery (the accumulator device) 15 for the aforementioned first motor generator 11.

A nomographic diagram of the single pinion type planetary gear mechanism 12 as the aforementioned torque synthesizing/distributing mechanism is present at (A) in FIG. 17. When the reaction torque by the first motor generator 11 is inputted to the sun gear 17 against the torque to be inputted to the carrier 19 and outputted by the engine 10, a higher torque than that inputted from the engine 10 appears at the ring gear 18 acting as the output element. In this case, the first motor generator 11 functions as a dynamo. With the speed (or the output speed) of the ring gear 18 being constant, on the other hand, the speed of the engine 10 can be continuously (or without any step) changed by increasing/decreasing the speed of the first motor generator 11. Specifically, the control for setting the speed of the engine 10 at a value for the best fuel economy can be made by controlling the first motor generator 11. Here, the hybrid type of this kind is called the "mechanical distribution type" or "split type".

On the other hand, a nomographic diagram of the Ravignaux type planetary gear mechanism constructing the transmission 6 is presented at (B) in FIG. 17. When the ring gear 25 is fixed by the second brake B2, a low gear stage L is set so that the torque outputted from the second motor generator 5 is amplified according to the gear ratio and applied to the output shaft 2. When the first sun gear 21 is fixed by the first brake B1, on the other hand, there is set a high gear stage H having a lower gear ratio than that of the low gear stage L. The gear ratio at this high gear stage is higher than "1" so that the torque outputted by the second motor generator 5 is augmented according to that gear ratio and applied to the output shaft 2.

Here, in the state where the individual gear stages L and H are steadily set, the torque to be applied to the output shaft 2 is such one as is augmented from the output torque of the second motor generator 5 according to the gear ratio. In the shifting transitional state, however, the torque is such one as is influenced by the torque capacities at the individual brakes B1 and B2 and by the inertia torque accompanying the speed change. On the other hand, the torque to be applied to the output shaft 2 is positive in the drive state of the second motor generator 5 but negative in the driven state.

The hybrid drive unit thus far described is intended to reduce the exhaust gas emission and to improve the fuel consumption by driving the engine 10 in a state as efficient as possible, and also to improve the fuel consumption, by performing the energy regeneration. In case a high driving force is demanded, therefore, with the torque of the main prime mover 1 being transmitted to the output shaft 2, the second motor generator 5 is driven to add its torque to the output shaft 2. In this case, in a low vehicle speed state, the transmission 6 is set at the low gear stage L to increase the torque to be added. In case the vehicle speed then rises, the transmission 6 is set at the high gear stage H to lower the speed of the second motor generator 5. This is because the driving efficiency of the second motor generator 5 is kept in a satisfactory state to prevent the fuel consumption from being deteriorated.

In the aforementioned hybrid drive unit, therefore, the shifting operation may be executed by the transmission 6 while the vehicle is running with the second motor generator 5 being active. This shifting operation is executed by switching the applications/releases of the aforementioned individual brakes B1 and B2. In case the low gear stage L is switched to the high gear stage H, for example, simultaneously as the second brake B2 is released from its applied state, the first brake B1 is applied to execute the shifting from the low gear stage L to the high gear stage H.

Figure 18:
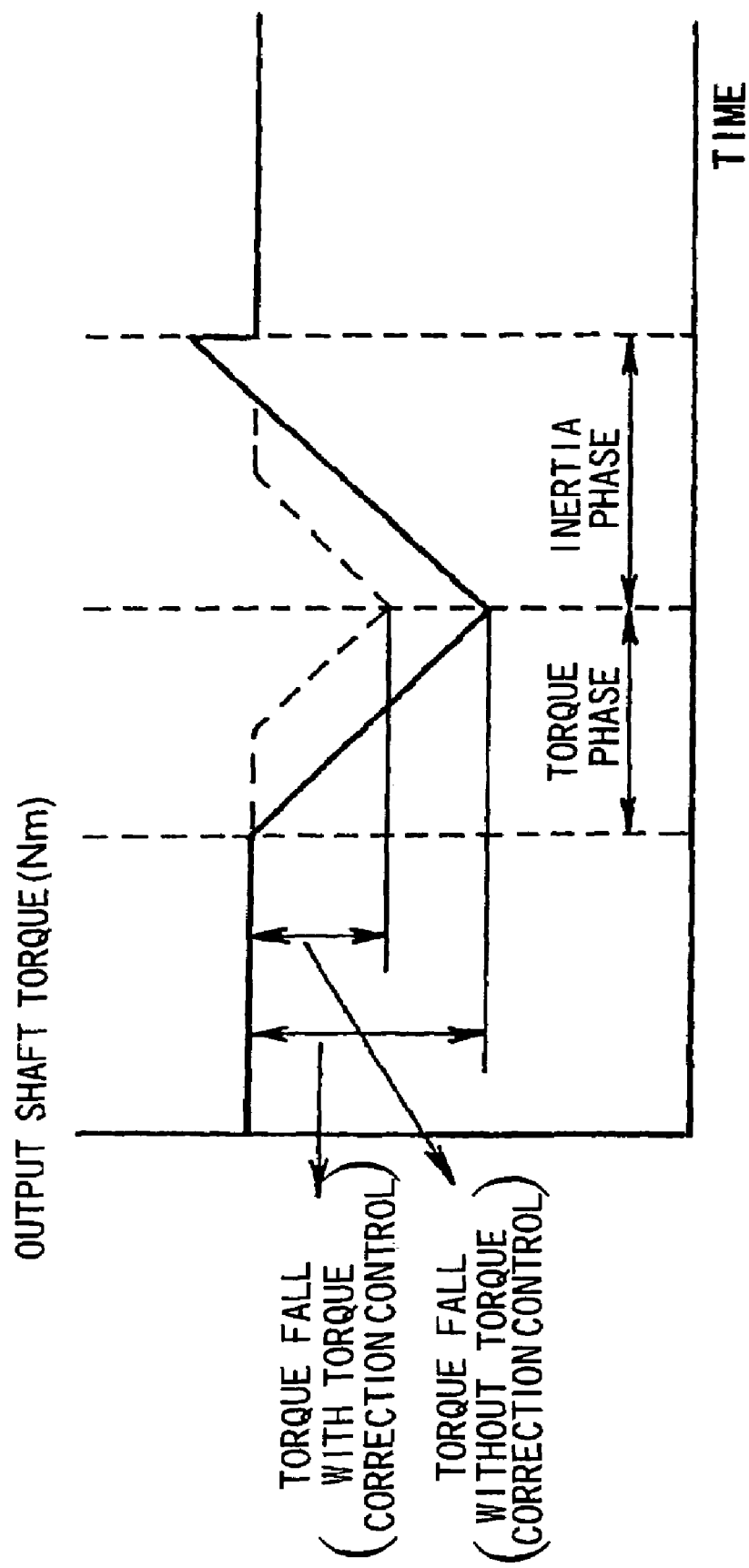
FIG. 18 is a diagram showing the changes in an output shaft torque at the shifting time with and without a torque correction on a main prime mover side.

In this shifting procedure, the torque capacities in the individual brakes B1 and B2 fall so that the torque to be applied from the second motor generator 5 to the output shaft 2 is lowered while being limited by the torque capacities at the individual brakes B1 and B2. This state is schematically shown in FIG. 18. In the torque phase after the shifting start from the low gear stage L to the high gear stage H, the output shaft torque gradually falls. After the inertia phase started, the output shaft torque gradually rises, and the torque rises/falls slightly in the inertia torque after the shifting end so that it is stabilized to a desired output shaft torque. Here, this torque fluctuation also occurs in case the transmission 6 is constructed by replacing any brake by a one-way clutch.

When a shifting thus occurs in the transmission 6 in which the second motor generator 5 acting as the assist prime mover is connected to the output shaft 2, the torque of the output shaft 2 changes to cause shocks. The fluctuation of the output torque is generally suppressed by controlling the output torque of the drive unit for the so-called "torque assist". In the hybrid drive unit, to which this invention is applied, the shocks are caused as a result of limiting the torque to be transmitted from the second motor generator 5 acting as the so-called "torque assist means" to the output shaft 2. By controlling the output torque of the second motor generator 5, therefore, the aforementioned shocks can be neither eliminated nor reduced. In the control device according to this invention, therefore, the shocks are eliminated or reduced by controlling the torque to be transmitted from the main prime mover 1 to the output shaft 2. Specifically, in the aforementioned shifting case from the low gear stage L to the high gear stage H, the torque fall is reduced by augmenting the torque to be transmitted from the main prime mover 1 to the output shaft 2. This state is indicated by broken lines in FIG. 18.

This control or controlling method of the present invention will be specifically exemplified in the following. First of all, the overall control will be described with reference to FIG. 1. In the example shown in FIG. 1, the shift position is detected (at Step S1). This shift position is each of the states selected by the shift unit (although not shown), such as: a parking position P for keeping the vehicle in a stop state; a reverse position R for a backward run; a neutral position N for a neutral state; a drive position D for a forward run; an engine braking position S for either increasing the drive torque or raising the braking force at a coasting time by keeping the engine speed relatively higher than the speed of the output shaft 2. At Step S1, there are detected the individual shift positions for the reverse, drive and engine braking positions.

Next, the drive demand is decided (at Step S2). On the basis of the information on the running state of the vehicle such as the shift position, the accelerator opening or the vehicle speed, and the information stored in advance such as the driving force map for example, the drive demand is decided.

The gear stage is decided (at Step S3) on the basis of the drive demand decided. Specifically, the gear stage to be set at the aforementioned transmission 6 is decided to the low gear stage L or the high gear stage H.

It is judged (at Step S4) whether or not the shifting is in the course to the gear stage to be set by the transmission 6. This judgment is to judge whether or not the shifting is to be executed. The answer of Step S4 is YES, in case the gear stage decided at Step S3 is different from that set at that time.

In case the answer of Step S4 is YES, the oil pressure is controlled (at Step S5) to execute a shifting for setting the gear stage decided at Step S3. This oil pressure is that of the aforementioned individual brakes B1 and B2. The oil pressure makes such a low-pressure standby control for the brake on the applied side as keeps the brake under a predetermined low level after a fast-fill to raise the oil pressure primarily for restoring the state just before the application, and for the brake on the released side as steps down the oil pressure to a predetermined level and then lowers it to be gradually released according to the speed of the second motor generator 5.

By thus controlling the application pressures of the individual brakes B1 and B2, the torque to be transmitted between the second motor generator 5 and the output shaft 2 is limited so that the output torque drops in the power-on state. This drop of the torque accords to the torque capacities of the brakes B1 and B2 in the transmission 6 so that the braking torque is estimated (at Step S6). This estimation of the braking torque can be made on the basis of the oil pressure commands of the individual brakes B1 and B2, the frictional coefficients of the frictional faces, the internal and external diameters of the frictional faces and so on.

The estimated braking torque corresponds to the reduction in the output torque so that a torque compensation control amount (or the target speed of the MG1) by the main prime mover 1 for compensating the reduction in the output torque is determined (at Step S7). In the hybrid drive unit shown in FIG. 16, the main prime mover 1 is constructed of the engine 10, the first motor generator 11 and the planetary gear mechanism 12 so that the torque at the shifting time can be compensated by controlling the torque of the first motor generator 11. At Step S7, therefore, the compensation control amount of the first motor generator 11 can be determined. This detail will be described hereinafter.

As described hereinbefore, the shifting operations of the transmission 6 are executed by changing the applied/released states of the individual brakes B1 and B2, and the torque capacity drops in the shifting operation. As a result, in the power-on state where the second motor generator 5 is outputting the torque, for example, the reaction to act on the second motor generator 5 falls. If the second motor generator 5 is not changed in its control amount, therefore, its speed rises. In this procedure, moreover, the output shaft torque may fall, the output torque of the second motor generator 5 is temporarily raised to compensate the fall of the output shaft torque by the second motor generator 5. On the contrary, the output torque of the second motor generator 5 may be reduced to lower the thermal load on the frictional member in the inertia phase during the shifting operation. Therefore, the torque correction amount of the second motor generator 5 is determined (at Step S8) in addition to the calculation of the correction control amount of the first motor generator 11.

Next, the individual control amounts or correction amounts thus determined are outputted. Specifically, there are outputted: the command signal (at Step S9) for controlling the braking oil pressure determined at Step S5; a command signal (at Step S10) for setting the target speed of the MG1 determined at Step S7; and a command signal (at Step S11) for setting the torque of the second motor generator 5 determined at Step S8.

In case the answer of Step S4 is NO because of no shifting, on the other hand, the braking oil pressure at the steady running time (not at the shifting time) is calculated (at Step S12). The braking oil pressure is one for setting the torque capacity corresponding to the torque to be transmitted between the second motor generator 5 and the output shaft 2, so that it can be calculated on the basis of the torque demanded to be transmitted between the second motor generator 5 and the output shaft 2.

Moreover, there is calculated (at Step S13) the torque of the second motor generator 5 at the steady running time. At this steady running time, the engine 10 is controlled for the satisfactory fuel consumption, and the excessiveness and shortage of the output of the main prime mover 1 for the drive demand in that state is compensated by the second motor generator 5. Therefore, the torque of the second motor generator 5 can be calculated on the basis of the torque outputted by the engine 10 and the first motor generator 11, and the torque demanded.

As described above, the speed of the engine 10 can be controlled by the first motor generator 11, and the engine 10 is run in the steady running state for the optimum fuel consumption. As the speed of the first motor generator 11, therefore, the speed for the optimum fuel consumption of the engine 10 is calculated (at Step S14) for the target as the speed of the first motor generator 11.

After this, the routine advances to Step S9 to Step S11 thus far described. At these Steps, there are individually outputted: the command signal for setting the braking oil pressure, as determined at Step S12; the command signal for setting the torque of the second motor generator 5, as determined at Step S13; and the command signal for setting the speed of the first motor generator 11, as calculated at Step S14.

Figure 2:
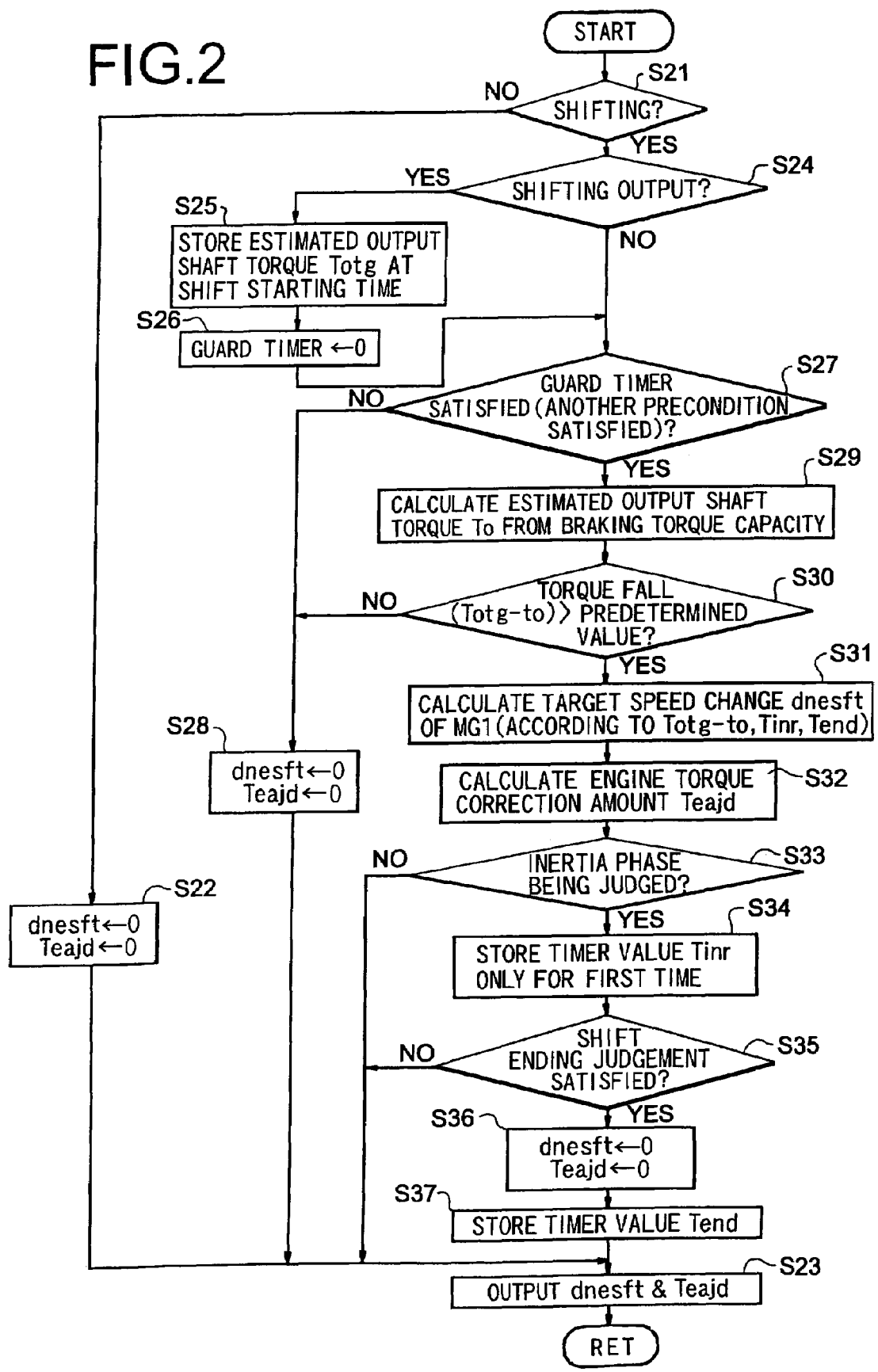
FIG. 2 is a more specific flow chart for explaining the control example by the control system of this invention.

Here will be described more specifically the correction control or correcting method of the output torque by the main prime mover 1 during the aforementioned shifting operation at the transmission 6. In FIG. 2, it is judged (at Step S21) whether or not the transmission 6 is being shifted. The judgment of this Step S21 is not the judgment whether or not the shifting operation is being actually executed but the judgment whether or not the vehicle is in the running state for the shifting operation. In case the answer of this Step S21 is NO, the output torque need not be compensated so that the target speed change dnesft of the first motor generator 11 and an engine torque correction amount Teajd are individually reset to zero (at Step S22).

Here, the target speed change dnesft of the first motor generator 11 is adopted for the torque compensation. This is because the target speed of the first motor generator 11 is feedback-controlled at all times to control the engine 10. And, there are outputted (at Step S23) the aforementioned target speed change dnesft and engine torque correction amount Teajd, which are set to zero. Here, in this case, these signals may not be outputted, but in short, there are not executed the target speed changing control of the first motor generator 11 and the engine torque correction control.

In case the answer of Step S21 is YES, it is judged (at Step S24) whether or not the command signal for executing that shifting has been outputted. In case the answer of Step S24 is YES because of the shifting output, an estimated output shaft torque Totg at the shift starting time is stored (at Step S25). In short, there is held the output torque to be kept during the shifting.

Then, the guard timer is reset to zero (at Step S26). This guard timer is a time period from the shifting output to the control starting instant for switching the applied/released states of the brakes B1 and B2 actually, and is set for preventing the erroneous control. In other words, the actual applying/releasing controls of the brakes B1 and B2 and the torque compensation control are started awaiting the elapse of that guard timer.

After the guard timer was reset to zero at Step S26 or in case the answer of Step S24 is NO because of no shifting output, it is judged (at Step S27) whether or not the guard timer is satisfied, that is, whether or not the time period set as the guard timer has been elapsed. In this case, there may be additionally judged the satisfactions of other preconditions such as that the oil temperature is at a predetermined level or higher, or that no fail occurs the control device has failed.

In case the time period has not elapsed and in case there is no shifting output, the answer of Step 27 is NO and it is then unnecessary to compensate the output torque so that the target speed change dnesft of the first motor generator 11 and the engine torque correction amount Teajd are individually reset to zero (at Step S28). These controls are similar to the aforementioned ones at Step S22. In this case, therefore, the routine also advances to Step S23, at which the individual signals dnesft and Teajd having the zero set value are outputted. In other words, there is executed neither the target speed changing control of the first motor generator 11 nor the engine torque correction control.

In case the answer of Step S27 is YES, on the contrary, the shifting control is executed to switch the applied/released states of the brakes B1 and B2 actually at the transmission 6 and the according torque compensation control. Specifically, accordingly as the guard timer is satisfied at first, the brake on the released side (i.e., the second brake in the case of the upshift) B2 is gradually released, and the brake on the applied side (i.e., the first brake in the case of the upshift) B1 is held in the low-pressure awaiting state just before the engagement, in which a pack clearance is reduced. On the basis of the torque capacities (or the apply pressures) of those brakes B1 and B2, therefore, an estimated output shaft torque To is calculated (at Step S29). In the torque phase during the shifting operation, more specifically, the torque to be applied from the second motor generator 5 to the output shaft 2 is restricted according to the torque capacities of the individual brakes B1 and B2 so that the output torque is accordingly lowered. If this output torque lowered is subtracted from the aforementioned output shaft torque Totg stored, therefore, it is possible to determine the estimated output shaft torque To at that point of time.

It is judged (at Step S30) whether or not the difference between the estimated output shaft torque To thus determined and the estimated output shaft torque Totg already stored at the shift starting time exceeds a predetermined value. If the torque capacities of the individual brakes B1 and B2 change, the torque of the output shaft 2 falls so that an actual shifting starts. At Step S30, therefore, the start of the shifting in fact is judged. In case the answer of Step S30 is NO, therefore, the routine advances to the aforementioned Step S28, there is not executed the so-called "torque compensation" of the output shaft torque.

If the answer of Step S30 is YES, on the contrary, the shifting in fact is started to lower the output shaft torque. For the torque compensation by the first motor generator 11, therefore, the target change dnesft of the first motor generator 11 is calculated (at Step S31). If the reaction at the first motor generator 11 is raised to lower the speed, as indicated by a broken line at (A) in FIG. 17, the torque can be raised to keep the speeds of the ring gear 18 and the output shaft 2 connected to the former, because the torque by the engine 10 acts upward, as at (A) in FIG. 17, on the carrier 19.

Here, the torque compensation by the first motor generator 11 is executed to reduce the fall of the output shaft torque, that is, the difference (Totg−To) between the estimated output shaft torque Totg at the shift starting time and the estimated output shaft torque To at each point of time during the shifting. Therefore, the target speed change dnesft of the first motor generator 11 is decided on the basis of the aforementioned torque difference (Totg−To), the time period Tinr from the shifting output to the start of the inertia phase, and the time period Tend from the shifting output to the shifting end. Specifically, the target speed change dnesft of the fist motor generator 11 is calculated according to the proceeding degree of the shifting operation. This calculation is the operation based on the values of the torque capacities of the individual brakes B1 and B2 at the individual points of time and the inertia torque accompanying the speed change of the first motor generator 11, for example. Alternatively, the calculation is the operation based on the predetermined map values according to the individual running states, by reading the map values according to the proceeding degree of the shifting operation.

If the reaction by the first motor generator 11 is raised, as indicated by the broken line at (A) in FIG. 17, moreover, the load acts to lower the engine speed. In order to suppress the reduction in the engine speed as much as possible thereby to keep the output shaft torque, therefore, the correction amount Teajd of the engine torque is calculated (at Step S32). This calculation can be made on the basis of the gar ratio (i.e., the ratio between the tooth numbers of the sun gear 17 and the ring gear 18) of the planetary gear mechanism 12 and the torque to be outputted by the first motor generator 11.

Next, the inertia phase is judged (at Step S33). In the state of the inertia phase, the speed of a predetermined rotary member changes to one according to the gear ratio after the gear shift. In the case of the upshift in the aforementioned hybrid drive unit shown in FIG. 16, therefore, the start of the inertia phase can be judged from the reduction in the speed of the second motor generator 5.

In case the answer of Step S33 is NO, the routine advances to Step S23. Specifically, the target speed change dnesft, as set at Step S31, of the first motor generator 11 and the engine torque correction amount Teajd set at Step S32 are outputted to execute the target speed changing control of the first motor generator and the engine torque correction control.

In case the first answer of Step S33 is YES, on the contrary, the inertia phase starts at the instant when the judgment is satisfied so that the timer value (i.e., the value of the timer having started the counting at the shifting output instant) at that instant is stored (or held) (at Step S34). In short, the starting time of the inertia phase is learned. This is because of optimizing the control initial value of the first motor generator 11 being shifted, so that the control initial value of the first motor generator 11 is increased/decreased according to the advancement/delay of the start of the inertia phase.

Moreover, the end of the shift is judged (at Step S35). This judgment can be made by judging whether or not the difference between the speed of the second motor generator 5 and the speed after the gear shift, that is, the product of the speed of output shaft 2 and the gear ratio after the gear shift is no more than a predetermined reference value. In case the answer of Step S35 is NO, the routine advances to Step S23, at which the target speed change dnesft and the engine torque correction amount Teajd calculated at Step S31 or at Step S32 are outputted. In short, there are executed the target speed changing control of the first motor generator 11 in the inertia phase and the engine torque correction control.

In case the shifting end judgment is satisfied so that the answer of Step S35 is YES, on the contrary, the target speed change dnesft and the engine torque correction amount Teajd are individually reset to zero (at Step S36). Next, the lapse time Tend from the shifting output at that instant is held (or stored) (at Step S37). After this, the routine advances to Step S23, at which the individual signals dnesft and Teajd reset to zero are outputted. Thus, there are ended the target speed changing control of the first motor generator 11 and the engine torque correction control.

Figure 3:
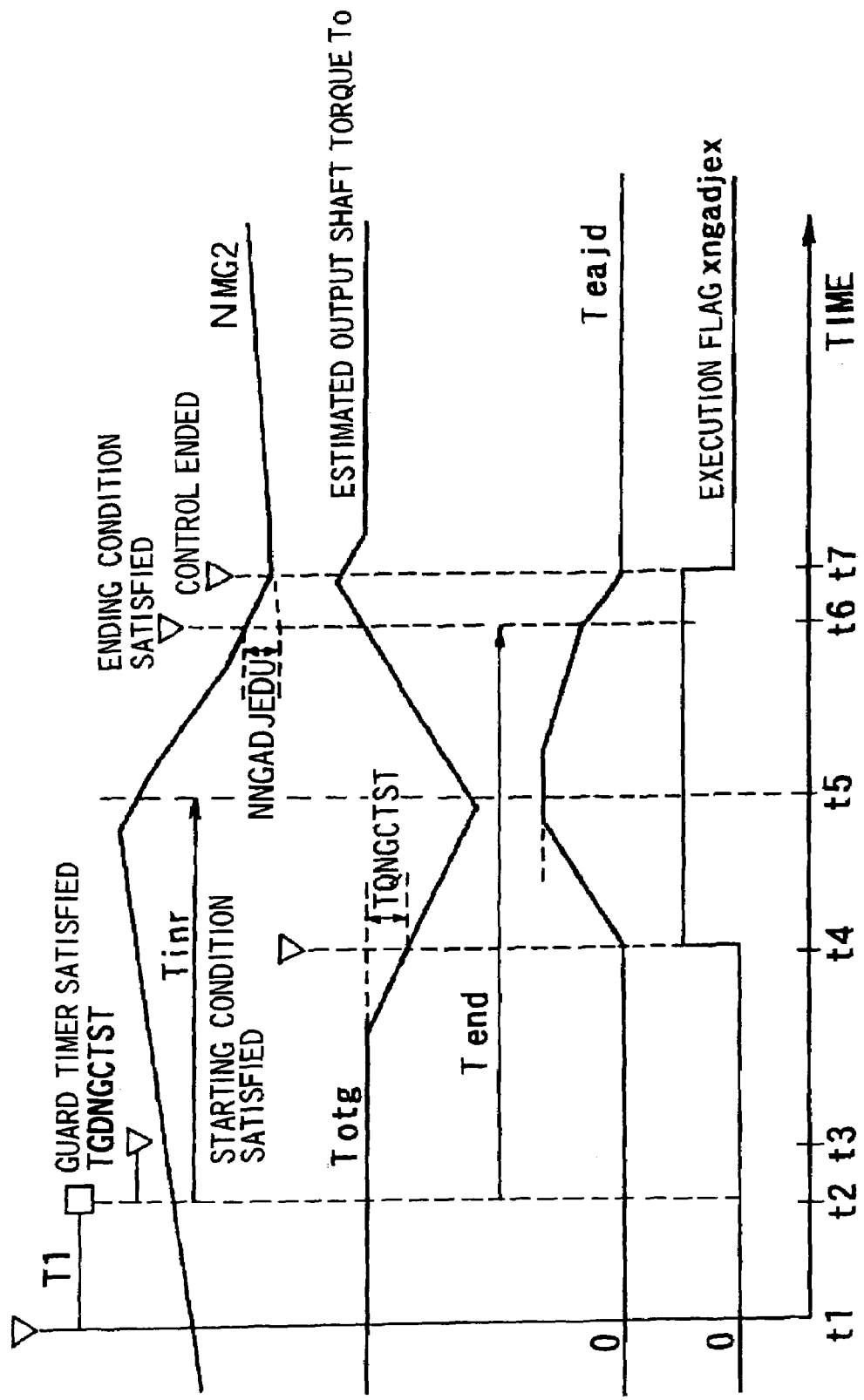
FIG. 3 is a diagram showing one example of the time chart of the case, in which a control shown in FIG. 1

The changes in the speed NMG2 of the second motor generator 5, the estimated output shaft torque To and the engine torque correction amount Teajd of the case, in which the aforementioned controls of FIG. 2 are executed, are shown as a time chart in FIG. 3. If the running state to execute the shifting at the transmission 6 is satisfied at a point of time t1 and is detected, a shifting signal is outputted at a point of time t2 after lapse of a predetermined time period T1. For example, there is executed the fast-fill, in which the feed pressure to the frictional engagement devices (e.g., the brakes in the aforementioned specific example) on the applied side is temporarily raised to reduce the pack clearance and in which the apply pressures are then lowered for the low-pressure standby.

When a predetermined guard timer is satisfied (at a point of time t3) after the shifting output, a substantial shifting control is started. For example, the apply pressure of the frictional engagement devices on the released side is stepwise lowered to a predetermined level. As a result, the transmission torque capacity between the second motor generator 5 and the output shaft 2 is lowered so that the estimated output shaft torque To is gradually lowered. When the torque fall, i.e., the difference between the estimated output shaft torque To and the estimated output shaft torque Totg at the shift starting time t2 exceeds a predetermined reference value TQMGCTST (at a point of time t4), the shifting control of the main prime mover 1 is started. In short, the target speed changing control of the first motor generator 11 and the engine torque correction control are started. Here is turned ON an execution flag xngadjex indicating that those controls are being made.

This control is to raise the reaction by the first motor generator 11 thereby to lower the speeds of the first motor generator 11 and the engine 10 accordingly, as described hereinbefore. Therefore, the inertia torque to be caused by the changes in the speeds is applied to the output shaft 2 so that the output shaft torque during the shifting is suppressed from falling. In this case, moreover, the engine torque at Step S32 is corrected so that the positive torque against the augmentation of the reaction by the first motor generator 11 rises to suppress or prevent the excessive drop of the engine speed. Here, FIG. 3 shows an example, in which the engine torque correction amount Teajd is set with an upper limit.

In accordance with the drop in the apply pressure of the released side brake and the rise in the apply pressure of the applied side brake, the change in the torque occurs in the transmission 6 and progresses to some extent. Then, a rotational change occurs in the rotary member such as the second motor generator 5. In short, the inertia phase starts (at a point of time t5). The inertia torque accompanying the rotational change is applied to the output shaft 2 so that the estimated output shaft torque gradually rises, as shown in FIG. 3.

In addition, the speed of the second motor generator 5 gradually lowers to the value according to the gear ratio after the gear shift, and the ending condition is satisfied (at a point of time t6) when the difference in the speed lowers to a predetermined value NNGADJEDU. As a result, the target speed change dnesft of the first motor generator 11 and the engine torque correction amount Teajd are controlled to zero. Moreover, the apply pressure of the applied side brake is quickly raised to that in the normal state after the gear shift, although not especially shown.

At a later point of time t7, moreover, the speed of the second motor generator 5 becomes equal to that according to the gear ratio after the gear shift, i.e., the speed of the output shaft 2, and the target speed change dnesft and the engine torque correction amount Teajd become zero to end the controls. In addition, the aforementioned execution flag xngadjex is reset to OFF (zero).

In the control device according to this invention, as described hereinbefore, during the shifting of the transmission 6 arranged between the second motor generator 5 and the output shaft 2, the torque control by the change in the speed of the first motor generator 11 constructing the main prime mover 1 is executed to suppress the drop of the output shaft. Therefore, the changing width or changing rate of the output shaft torque accompanying the shifting is suppressed to prevent or avoid the shifting shocks.

The aforementioned shifting of the transmission 6 is executed by releasing one of the individual brakes B1 and B2 and applying the other. It is, therefore, preferable to control the apply pressure of at least one brake in accordance with the progressing state of the shifting operation. In this case, the apply pressure being controlled relates to either the torque applied from the side of the second motor generator 5 to the output shaft 2 or its fall and further to the torque to be corrected on the side of the main prime mover 1. Therefore, the torque correction on the side of the main prime mover 1 can be done on the basis of the apply pressure of the brake or its control amount.

Figure 4:
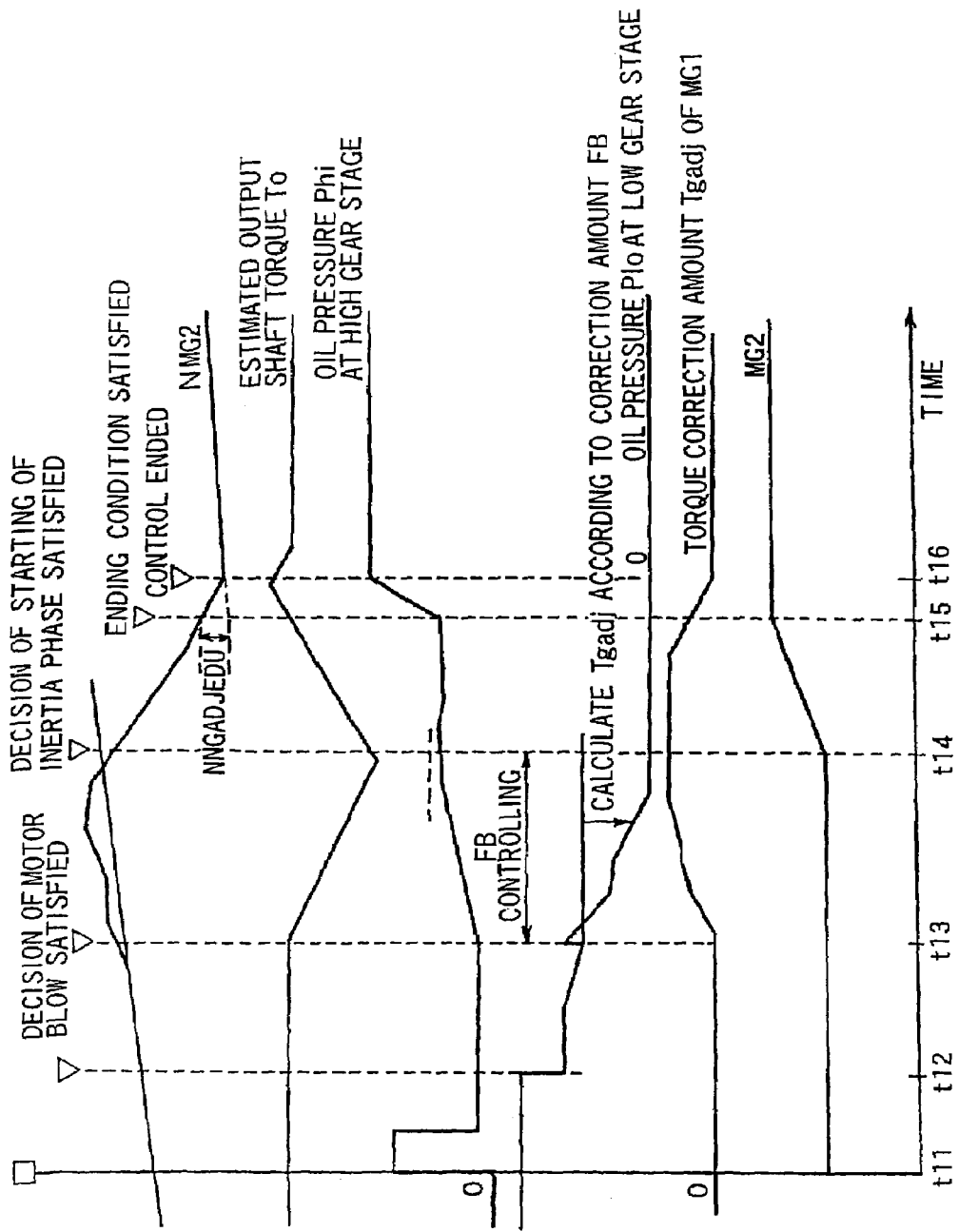
FIG. 4 is a diagram showing one example of the time chart of the case, in which a torque correction amount by a first motor generator is set according to the feedback correction amount of an apply pressure.

FIG. 4 is a time chart showing an example of that control. Here is exemplified an example of the power-on up shift, in which the shifting is made from the low gear stage L to the high gear stage H while the torque is being outputted from the second motor generator 5. Specifically, a point of time t11 for the shifting output corresponds to that t2 in FIG. 3, at which the oil pressure is quickly fed to the first brake B1 at the high gear stage so that the so-called "fast-fill" is executed. This is the control for temporarily raising an oil pressure Phi at the high gear stage and then keeping it at a predetermined low level.

After this, the guard timer is satisfied, or the shifting control is substantially started after the guard timer satisfaction, so that an oil pressure Plo of the second brake B2 at the low gear stage is stepwise lowered to a predetermined level (at a point of time t12). As the oil pressure of the second brake B2 is gradually lowered (or swept down), the negative torque having acted on the second motor generator 5 falls, so that the speed NMG2 of the second motor generator 5 rises. When the difference between that speed NMG2 and the speed according to the gear ratio before the shifting operation becomes larger than a predetermined judgment reference value, the decision of the so-called "motor blow" for the speed of the second motor generator 5 to rise is satisfied (at a point of time t13). In this case, the oil pressure of the second brake B2 is temporarily raised in an overlapping manner so as to avoid the intact rise of the speed of the second motor generator 5.

And, the oil pressure Plo at the low gear stage is lowered while gradually raising (or sweeping up) the oil pressure Phi at the high gear stage. In this case, the oil pressure Plo at the low gear stage is so feedback-controlled (or FB-controlled) that the speed of the second motor generator 5 may exceed the speed according the gear ratio at the low gear stage by a predetermined amount. In other words, the slide of the second brake B2 at the low gear stage is so feedback-controlled on the basis of the speed of the second motor generator 5 that the speed of the second motor generator 5 may take the aforementioned value.

By changing the individual oil pressures Phi and Plo as mentioned above, the estimated output shaft torque To falls so that the output torque of the first motor generator 11 is controlled to suppress that fall. The inertia torque could be generated by the speed control of the first motor generator 11 to supplement the output shaft torque. However, the first motor generator 11 is connected to not only the engine 10 but also the output shaft 2 through the planetary gear mechanism 12 so that the fall of the output shaft torque can be suppressed by controlling the output torque of the first motor generator 11. In the example shown in FIG. 4, therefore, the output torque of the first motor generator 11 is controlled.

Here, the initial control contents such as the starting timing of the torque control of the first motor generator 11 or the initial control amount or the torque rising gradient at the control starting time are corrected on the basis of the learning time period Tinr till the learning of the inertia phase and/or the learning time Tend till the satisfaction of the ending condition. Thus, the torque control of the first motor generator 11 is made more precise.

Specifically, a torque correction amount (or the torque correction amount of MG1) Tgadj of the first motor generator 11 is set on the basis of the feedback correction amount of the low gear stage oil pressure Plo, as based on the speed deviation of the second motor generator 5. Here, FIG. 4 shows the example, in which the torque correction amount Tgadj is set with the so-called "upper limit (or upper guard)".

The torque capacity to participate in the shifting operation is determined not only by the apply pressure but also by the friction coefficient so that the dispersion of the apply pressure or the friction coefficient appears as the speed of the second motor generator 5. In the case of the construction for the aforementioned feedback control, therefore, the dispersion of the control of the apply pressure can be reflected on the control of the low gear stage oil pressure Plo, so that the control of the individual oil pressures and the speed control, as based on the former, of the second motor generator 5 can be stabilized.

Accordingly as the low gear stage oil pressure Plo gradually falls and as the high gear stage oil pressure Phi gradually rises, the speed of the second motor generator 5 begins to drop gradually toward the speed according to the gear ratio at the high gear stage H after the shifting operation. As a result, the decision of starting the inertia phase is satisfied (at a point of time t14) when the speed NMG2 of the second motor generator 5 becomes lower than that according to the gear ratio at the low gear stage L by a predetermined value or more.

Now, at this point of time, the second brake B2 at the low gear stage is completely released so that the low gear stage oil pressure Plo is substantially zero. Therefore, the speed of the second motor generator 5 and the torque to be applied from the second motor generator 5 to the output shaft 2 are caused by the high gear stage oil pressure Phi of the first brake B1 and the inertia torque due to the change in the speed.

As the speed of the second motor generator 5 becomes lower toward the value at the high gear stage H after the shifting operation and as the estimated output shaft torque To gradually rises, the shift ending condition is satisfied (at a point of time t15) on the basis of that speed. As a result, immediately after the high gear stage oil pressure Phi is quickly raised to the line pressure or its corrected pressure, the control is ended (at a point of time t16). Here, the output torque of the second motor generator 5 is gradually raised when the decision of starting of the inertia phase is satisfied (at the point of time t14).

Figure 5:
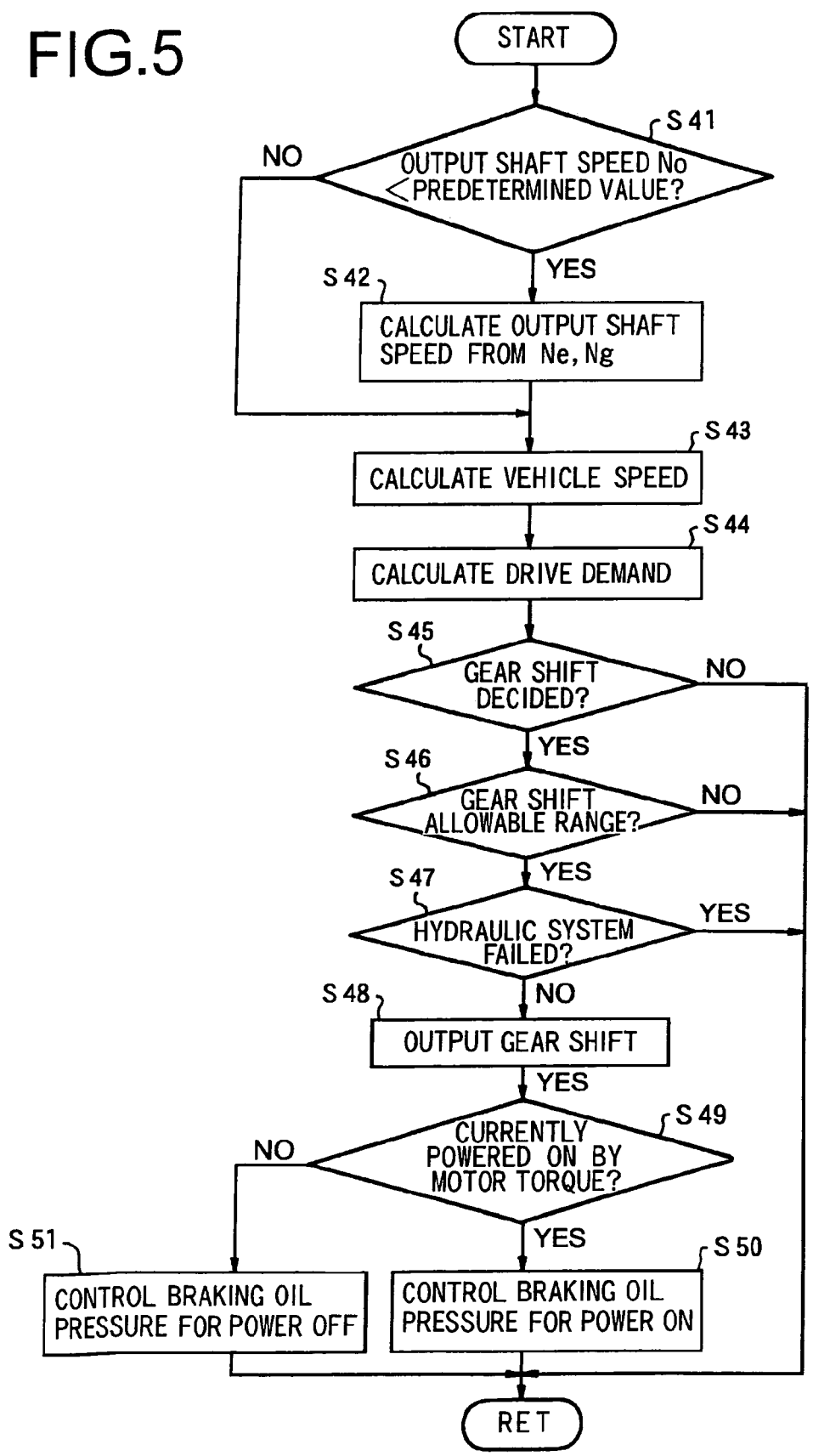
FIG. 5 is an overall flow chart for explaining another control example by the control system of this invention.

Here, the shifting operation at the aforementioned transmission 6 is judged like that at the general automatic transmission on the basis of the running state of the vehicle. Therefore, it is preferable to detect the running state of the vehicle precisely, and the shifting operation is executed according to the running state detected. FIG. 5 shows another example of the shifting control or shifting method at the transmission 6. In the shown example, the vehicle speed is calculated at first as one requisite for the running state of the vehicle. Specifically, it is judged (at Step S41) whether or not an output shaft speed No detected by an output shaft speed sensor Sout for detecting the speed of the output shaft 2 is lower than a predetermined value.

The sensor Sout of this kind generally uses a pulse gear and an electromagnetic pickup. This output shaft speed sensor Sout has the lower detection precision for the lower speed. In case the answer of Step S41 is YES, that is, in case the speed of the output shaft 2 is low, the speed of the output shaft 2 is calculated (at Step S42) from the speed Ng of the first motor generator 11 and the speed of the output shaft 2. Specifically, the aforementioned relation shown at (A) in FIG. 17 holds among the engine speed Ne, the speed Ng of the first motor generator 11 and the speed of the output shaft 2, so that the speed of the output shaft 2 can be calculated from the engine speed Ne and the speed Ng of the first motor generator 11.

In case the answer of Step S41 is NO, the vehicle speed is calculated on the basis of the speed No by the output shaft speed sensor Sout. In case the answer of Step S41 is YES, on the contrary, the vehicle speed is calculated (at Step S43) on the basis of the speed of the output shaft 2 calculated at Step S42. Therefore, the vehicle speed is precisely determined.

Next, the drive demand is calculated (at Step S44). This drive demand is a driving force demanded for the second motor generator 5 and can be calculated by the method which is generally adopted in the prior art. For example, the drive demand can be determined on the basis of the vehicle speed, the accelerator opening and the prepared map, as described hereinbefore.

Moreover, the gear shift is decided (at Step S45). This decision can be done like that at the ordinary automatic transmission. Specifically, an upshift line and a downshift line are provided in a shifting diagram (or a shifting map) using the vehicle speed and the drive demand as parameters. The decision of the gear shift is satisfied in case the vehicle speed or the drive demand intersects either of the shifting lines. In case the vehicle speed changes along the upshift line from the low speed side to the high speed side, for example, the decision of the upshift is satisfied. In case the vehicle speed changes to intersect the downshift line from the high speed side to the low speed side, on the contrary, the decision of the downshift is satisfied. If the vehicle speed changes but does not intersect either of the shifting lines, moreover, the gear stage at that point of time is kept so that the decision of the gear shift is not satisfied.

Figure 6:
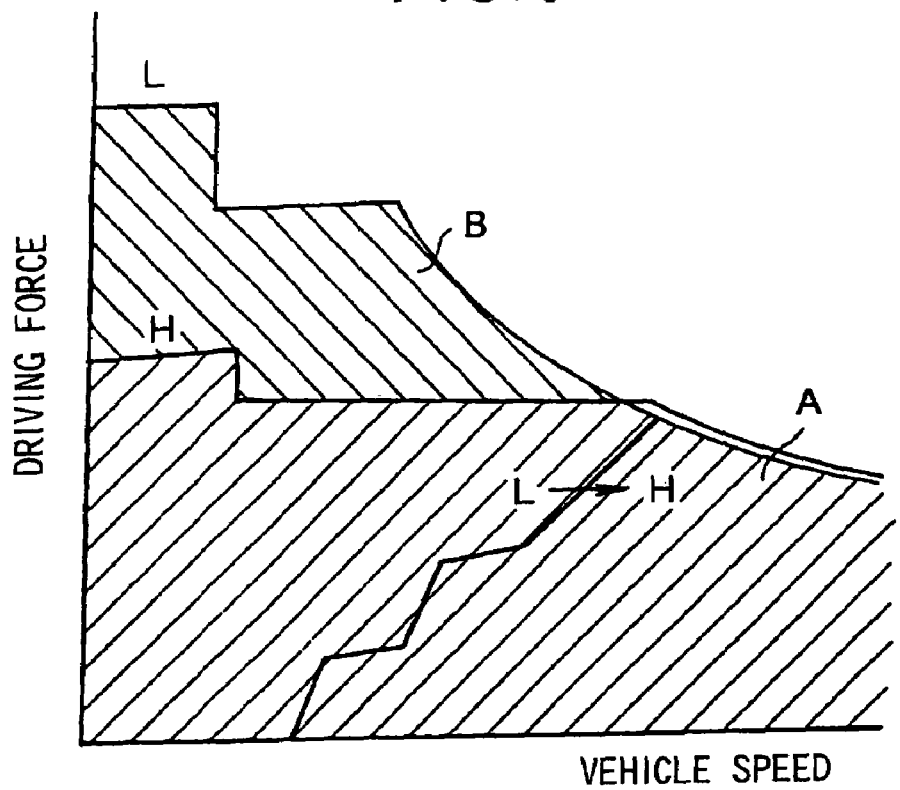
FIG. 6 is a diagram schematically showing a region, in which an equal power is generated before and after a gear shift.

The shifting lines are set to equalize the powers before and after the gear shift. Specifically, the output characteristics of the second motor generator 5 to add the torque to the output shaft are shown in FIG. 6. A region B for an output at the low gear stage L is more extended to a higher driving force side than a region A for an output at the high gear stage H. If the upshift is made to the high gear stage H with the low gear stage L being set on the higher driving force side than the region A, therefore, the driving force drops into the region A. Therefore, this change in the driving force may cause shocks. In order to avoid this situation, the shifting lines are so set that the gear shift may occur in case the running state of the vehicle is in the region A, that is, the powers may be equalized before and after the gear shift. FIG. 6 shows one example of the upshift line schematically.

In case the answer of Step S45 is NO, the routine is returned without any especial control. In case the answer of Step S45 is YES, on the contrary, it is decided (at Step S46) whether or not the running state of the vehicle is within a shift allowable range. The condition for determining this shift allowable range is whether or not the so-called "rattling noises" occur in the drive line between the second motor generator 5 and the output shaft 2 or at their relating portion. In the vicinity of the zero driving force, more specifically, the engagement/disengagement of the tooth surfaces is so caused that the meshing states of the individual gears composing the transmission 6 are inverted, and the gear shift is inhibited in this state. Moreover, there is inhibited either the gear shift to the power mode in the negative state of the driving force or the gear shift to a torque-up state. Still moreover, there is inhibited either the gear shift to the regenerative mode in the positive state of the driving force or the gear shift to a torque-down state.

In case the answer of Step S46 is NO, therefore, the gear shift cannot be executed so that the routine is returned without any especial control. In case the answer of Step S46 is YES, on the contrary, the failure of the control device such as the failure of the hydraulic system is judged (at Step S47). This judgment can be done on the basis of no buildup of a predetermined oil pressure irrespective of the output of a control signal.

In case the answer of Step S47 is YES because of the failure, the routine is returned without any especial control because the situation allows no gear shift to be executed. In this case, therefore, the prevailing gear stage is kept. In case the answer of Step S47 is NO, on the contrary, the gear shift is outputted (at Step S48). Here, this gear shift output includes not only a gear shift between the high gear stage H and the low gear stage L but also a gear shift between the forward range (or the drive range) and the backward range (or the reverse range).

Moreover, it is judged (at Step S49) whether or not the gear shift is made in the power-on state. This judgment can be made on the basis of the output torque of the second motor generator 5. In case the second motor generator 5 is outputting the torque, the power-on state prevails so that the answer of Step S49 is YES. Not only in case the torque is inputted from the output shaft 2 to the second motor generator 5 but also in case the second motor generator 5 is not outputting the torque, on the contrary, the power-off state prevails so that the answer of Step S49 is NO.

Figure 7:
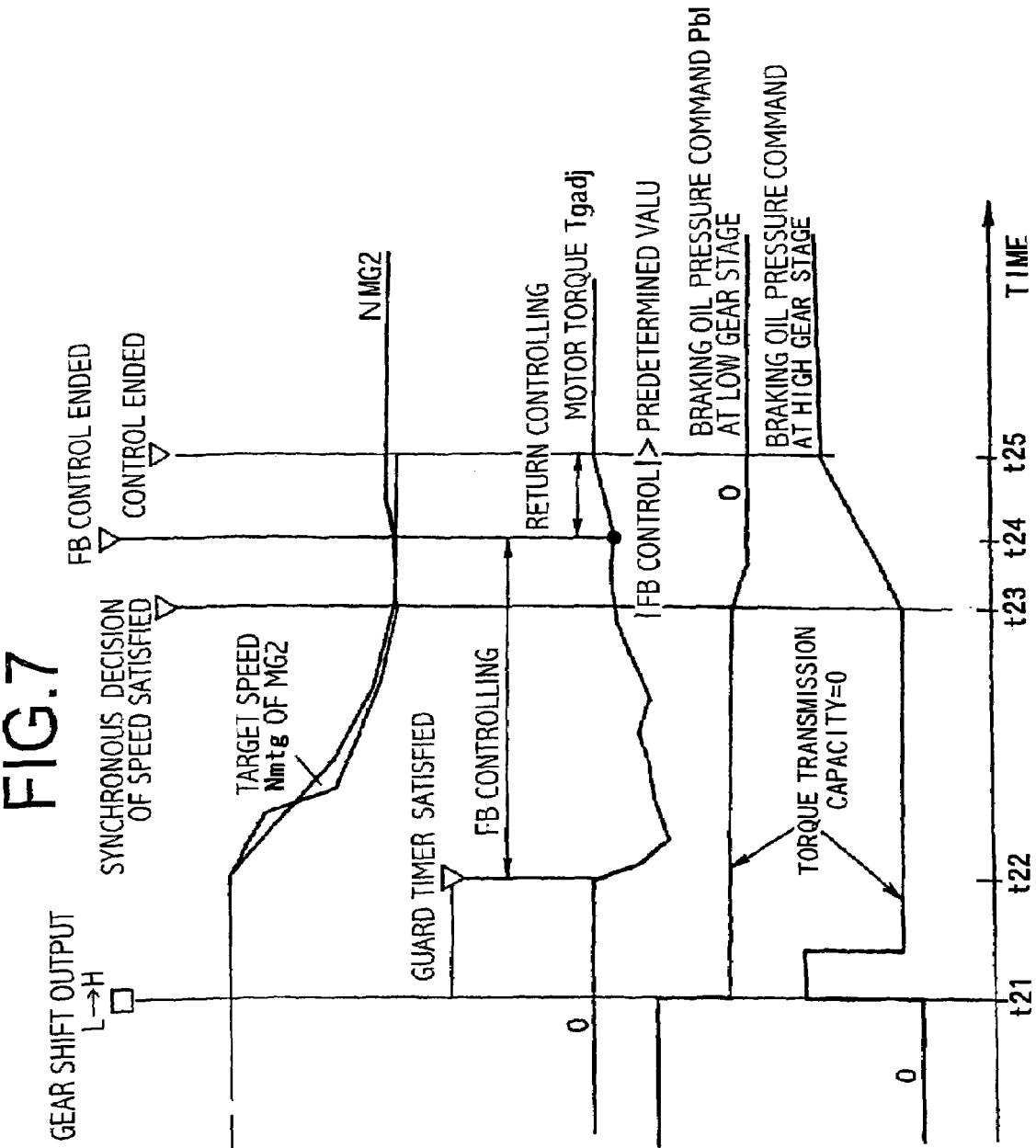
FIG. 7 is a diagram showing a time chart of the case of a power-off upshift.

In case the answer of Step S49 is YES, moreover, the oil pressures of the individual brakes B1 and B2 in the transmission 6 are controlled for the power-on state (at Step S50). The aforementioned shifting control, as described with reference to FIG. 4, is one example of the oil pressure control in this power-on state. In case the answer of Step S49 is NO, on the contrary, the oil pressure control in the power-off state is executed (at Step S51). An example of the upshift is shown as a time chart in FIG. 7.

In the case of the upshift, the speed of the second motor generator 5 after the gear shift is made lower than that before the gear shift. In the power-off state, therefore, the second motor generator 5 has its speed naturally lowered when separated from the drive line. Therefore, a low gear stage oil pressure command value Pbl is stepped down to a low level for a complete release, and a high gear stage oil pressure command value Pbh is temporarily raised to execute the fast fill, in which the pack clearance of the first brake B1 is reduced.

By thus controlling the oil pressures of the individual brakes B1 and B2, the transmission torque between the second motor generator 5 and the output shaft 2 is lowered to reduce the generative torque by the second motor generator 5. Therefore, the torque correction control on the side of the main prime mover 1 is started from the point of time t22, at which the guard timer is satisfied. On the other hand, the torque of the second motor generator 5 is so feedback-controlled (or FB-controlled) that the deviation between the speed NMG2 of the second motor generator 5 and its target speed Nmtg may be within a predetermined value.

In this meanwhile, the speed NMG2 of the second motor generator 5 gradually lowers. When the difference from the speed according to the gear ratio at the high gear stage H after the gear shift becomes equal to or smaller than a predetermined value, the synchronous decision of the speed is satisfied (at a point of time t23). Simultaneously with this, the high gear stage oil pressure command value Pbh is increased, and the low gear stage oil pressure command value Pbl is reduced to zero.

AS the speed NMG2 of the second motor generator 5 approaches the synchronous speed, the absolute value of the feedback control torque exceeds a predetermined value (at a point of time t24), and the feedback control is ended. After this, the motor torque according to the drive demand is restored. After this, the control is ended (at a point of time t25).

Figure 8:
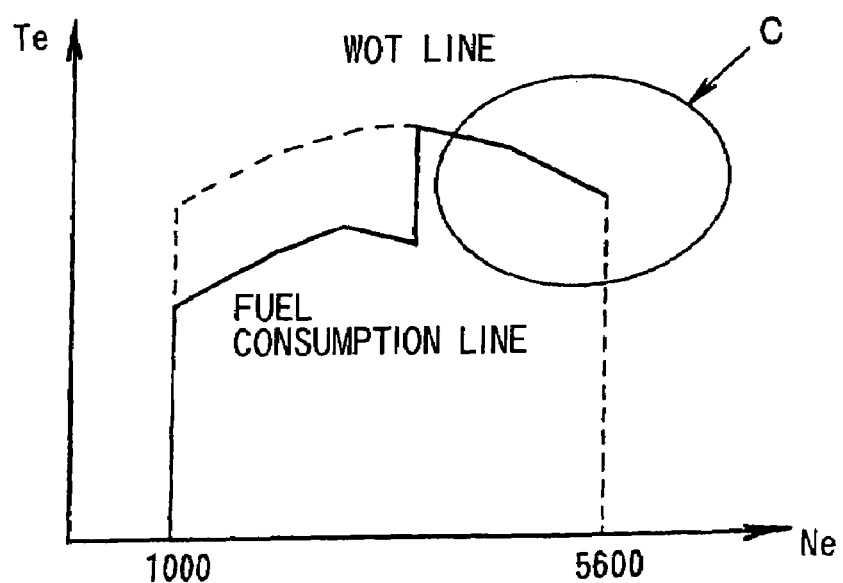
FIG. 8 is an output characteristic diagram of an engine and schematically shows a region, in which a torque gradient is negative.

In case the fall of the output shaft torque during the shifting operation of the transmission 6 is suppressed by the torque on the side of the main prime mover 1, the engine speed may be changed by correcting the torque of the first motor generator 11, as described hereinbefore. On the other hand, the output characteristics of the general internal combustion engine such as the gasoline engine or the Diesel engine are such that a torque Te falls (at a negative torque gradient (Te/Ne)) according to the increase in the speed Ne within the range of the speed Ne at a predetermined value or higher, as schematically shown in FIG. 8.

Figure 1:
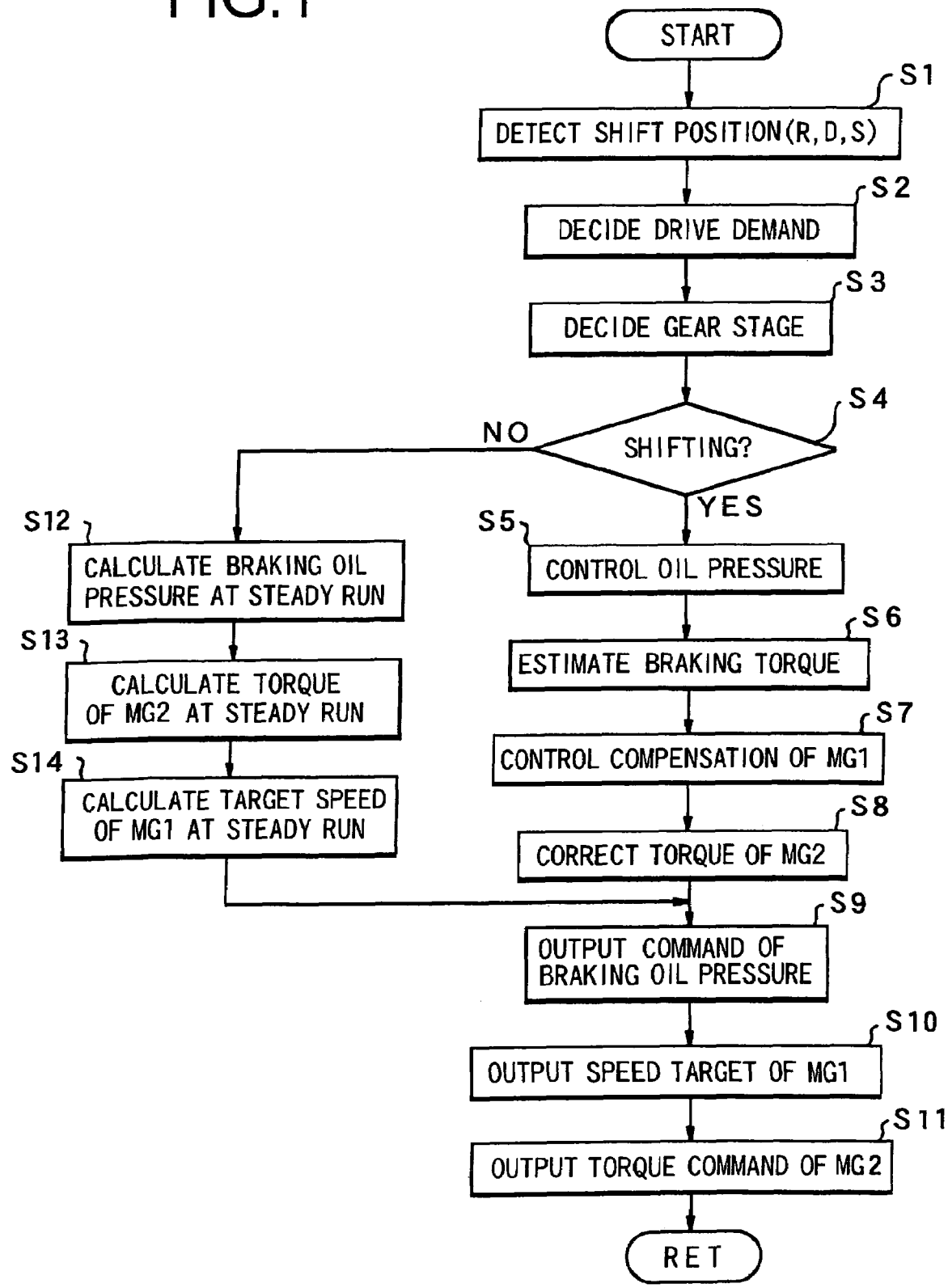
FIG. 1 is an overall flow chart for explaining a control example by a control system of this invention.

In case the vehicle is running as a whole in the power-on state, therefore, it is preferable to execute either the torque compensation by the first motor generator 11 at the aforementioned Step S7 in FIG. 1 within the region (i.e., the C region of FIG. 8), in which the torque gradient is negative, or the correction control of the speed of the first motor generator 11 in the control shown in FIG. 2. With this construction, the engine torque is raised accordingly as the engine speed is to be reduced at the gear shifting time, so that the reduction of the engine speed is suppressed after all. In other words, the necessity for reducing not only the correction control by the main prime mover 1 of the output shaft torque at the gear shifting time but also the engine speed control, so that the control is facilitated.

Here will be briefly described the relations between the aforementioned specific example and this invention. The means (i.e., the inverter 14, the battery 15 and the electronic control unit (MG1-ECU) 16) for the aforementioned control of Step S7 or Step S31 corresponds to a first torque correcting means (or corrector) or first torque correcting means of this invention; means (i.e., the electronic control unit (E-ECU) 13) for the control of Step S32 corresponds to a second torque corrector or second torque correcting means; and means (i.e., the electronic control unit (T-ECU) 27) for the control of Step S46 corresponds to a shift inhibitor or shift inhibiting means of this invention.

According to the aforementioned control shown in FIG. 1, the torque of at least one of the motor generators 5 and 11 is controlled for compensating the output shaft torque during the gear shift, but the second motor generator 5 is connected to the output shaft 2 through the transmission 6. In the control device of this invention, therefore, the torque of the second motor generator 5 is controlled according to the gear shifting state so as to suppress the fluctuation of the output shaft torque accompanying the gear shift. This corresponds to the control of Step S8 shown in FIG. 1. In short, the control device according to this invention is constructed to execute the controls shown in FIG. 9.

Figure 9:
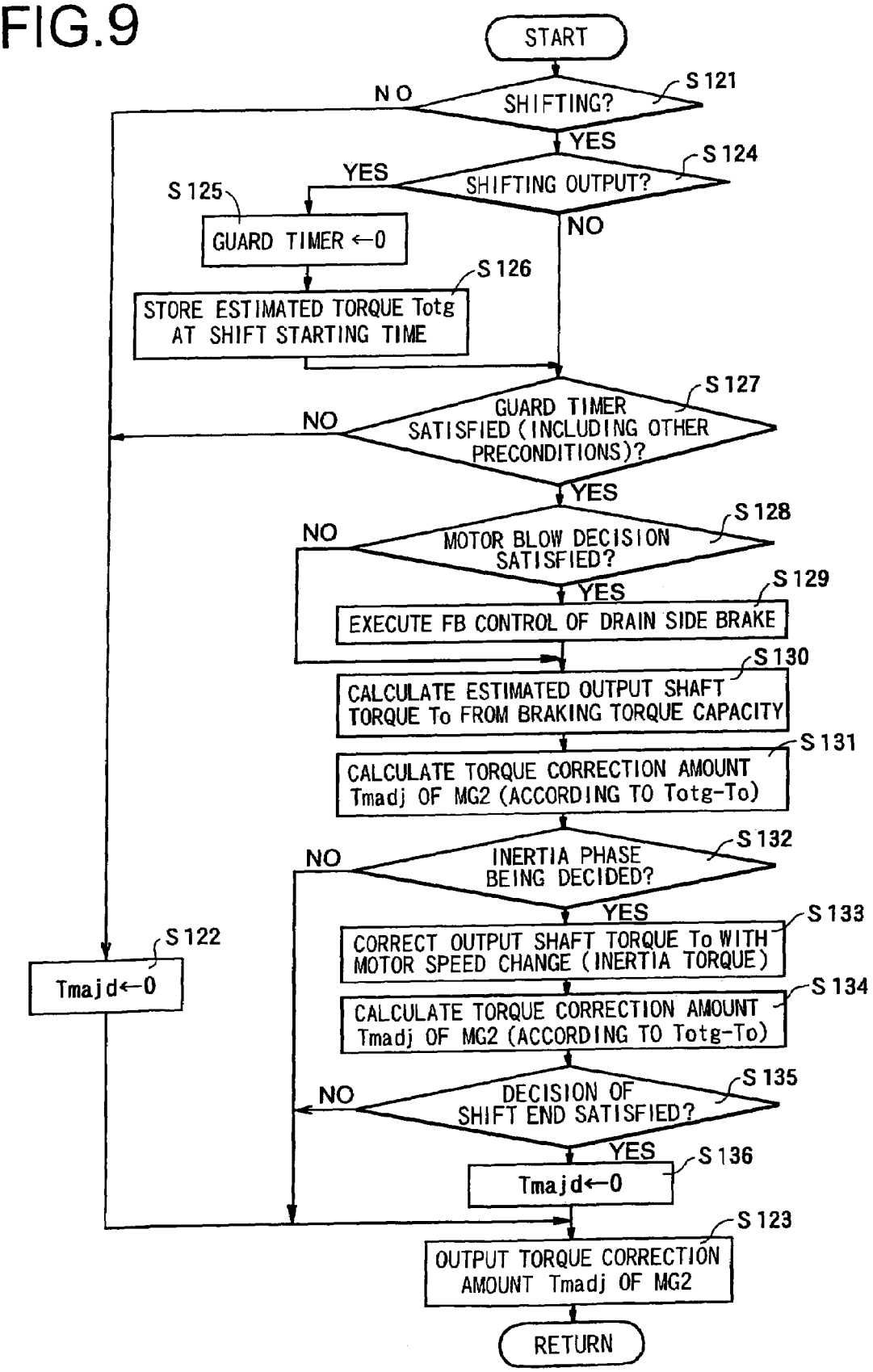
FIG. 9 is a flow chart for explaining another control example by the control system of this invention.

In the control example or controlling method shown in FIG. 9, it is judged at first (at Step S121) whether or not the transmission 6 is being shifted. The judgment of the gear shift at the transmission 6 is done, like the judgment of the gear shift in the ordinary vehicular automatic transmission, on the basis of the shifting map using the vehicle speed or the output shaft speed, the accelerator opening and the drive demand as the parameters. Therefore, it is enabled to judge the Step S121 by the fact that the judgment of the gear shift is satisfied or that the control accompanying the satisfaction of the judgment is started.

In case the answer of Step S121 is NO, that is, in case the transmission is not being shifted, a torque correction Tmadj of the second motor generator 5 is set to zero (at Step S122). The torque correction amount Tmadj or "0" of the second motor generator 5 is outputted (at Step S123). In other words, the torque of the second motor generator 5 is controlled to one according to an acceleration/deceleration demand such as an acceleration demand (or a demand amount of the driving force) or a braking force demand, which is not corrected for the cause of the gear shift. After this, the routine is returned.

In case the answer of Step S121 is YES because of being shifted, on the contrary, it is judged (at Step S124) whether or not the control signal for the gear shift has been outputted. This control signal is exemplified by one for lowering the apply pressure of the frictional engagement device, which has been applied for setting the gear stage before the gear shift, to start the gear shift substantially. If the shifting output is at the point of judging time at Step S124, the answer of Step S124 is YES. If the shifting output was already present, the answer of Step S124 is NO. In case the answer of Step S124 is YES, moreover, the shifting sequence measuring timer (or the guard timer) was reset to zero for the start (at Step S125). Moreover, the estimated value Totg of the output shaft torque To at this point of time is stored (at Step S126). This is because the estimated torque Totg at the shift starting time is adopted as the target value of the output shaft torque during the shifting operation. After this, it is judged (at Step S127) whether or not the guard timer has been satisfied, that is, whether or not a predetermined time period has elapsed from the starting time of the guard timer.

In case the answer of Step S124 is NO because the shifting output was already present, on the contrary, the guard timer has already been started. Therefore, the routine instantly advances to Step S127, at which it is judged whether or not a predetermined time period has elapsed from the starting time of the guard timer. Here, this Step S127 may judge the satisfaction of the preconditions for the torque correction control such as that the driving force is not quickly changed, that the oil temperature is at a predetermined level or higher, and that the control has not failed.

In case the answer of Step S127 is NO, therefore, the situation is not that the output torque of the second motor generator 5 is corrected to execute the assistance of the output shaft torque. Therefore, the routine advances to Step S122, at which the correction amount Tmadj of the output torque of the second motor generator 5 is set to zero. In case the answer of Step S127 is YES, on the contrary, it is judged (at Step S128) whether or not the decision of the motor blow has been satisfied.

In the transmission 6 thus far described, the gear shifting operations are executed by the so-called "engagement interchange", in which one brake B1 (or B2) is released whereas the other brake B2 (or B1) is applied. At the gear shifting time in the power-on state, in which the second motor generator 5 is outputting the torque, therefore, the torque having been acting to suppress the rotation of the second motor generator 5 falls as the torque capacity of the brake on the released side (or on the drain side) drops. Therefore, the speed of the second motor generator 5 becomes higher than that according to the gear ratio at that time. Therefore, the judgment of Step S128 can be made on the basis of the speed NT of the second motor generator 5.

In case the decision of the blow of the speed of the second motor generator 5 is satisfied so that the answer of Step S128 is YES, the feedback (FB) control of the drain side brake (i.e., the frictional engagement device on the released side) is executed (at Step S129). Specifically, the apply pressure of the brake on the drain side is so controlled on the basis of the speed difference detected that the speed of the second motor generator 5 may be higher by a predetermined value than that, which is determined on the basis of the gear ratio before the gear shift.

The relation between the apply pressure of the frictional engagement device and the torque capacity of the same can be predetermined by experiments or learning controls. On the basis of the apply pressure set by the feedback control (or the FB control), the torque capacity of the frictional engagement device on the released side, i.e., the brake B1 (or the brake B2) can be determined. The torque of that torque capacity and the torque of the torque capacity on the applied side are transmitted from the second motor generator 5 to the output shaft 2 so that the output shaft torque To is calculated from the torque capacity of the drain side brake (at Step S130). In short, on the basis of the torque capacity of the drain side brake, the fall of the output shaft torque To is determined so that the output shaft torque To can be calculated. Here, the routine advances directly to this Step S130, in case the decision of the motor blow has already been satisfied so that the answer of Step S128 is NO.

In the state where the blow of the second motor generator 5 occurs, the transmission torque capacity of the transmission 6 drops so that the output shaft torque To is lower than the desired one. In other words, a difference is made between the estimated torque Totg as the target values stored at the aforementioned Step S126 and the output shaft torque To estimated at Step S130, so that the correction amount Tmadj of the output torque of the second motor generator 5 is calculated (at Step S131) according to the difference (Totg−To) of those torques.

More specifically, this state is in the torque phase after the shifting start, and the transmission capacity of the torque from the input side is lowered with a little slide in the drain side brake, and no speed change is in the predetermined rotary member. In this state of the early shifting time, the output shaft torque To has a tendency to fall so that the output torque of the second motor generator 5 is raised and corrected. After all, the torque of the second motor generator 5 is corrected by the coordination control with the torque capacity of the released side frictional engagement device or its associated apply pressure (or the oil pressure).

Next, it is judged (at Step S132) whether or not the start of the inertia phase has been decided. If the answer of Step S132 is NO, the shifting state is still in the torque phase. In order to execute the torque correction of the second motor generator 5 in the torque phase, therefore, the routine advances to Step S132, at which the correction amount Tmadj of the torque of the second motor generator 5 is outputted.

In case the decision of the start of the inertia phase is satisfied so that the answer of Step S132 is YES, on the contrary, the output shaft torque To is calculated (at Step S133) considering the inertia torque. In the gear shifting case from the low gear stage L to the high gear stage H, for example, the speed of a predetermined rotary member such as the second motor generator 5 is lowered to the value according to the gear ratio at the high gear stage H after the gear shift. Therefore, the inertia torque occurs according to that speed change and appears in the output shaft torque To. Therefore, the output shaft torque To is corrected on the basis of that inertia torque.

In accordance with the torque difference (Totg−To) between the output shaft torque To thus determined and the estimated torque Totg as the aforementioned target value, the correction amount Tmadj of the second motor generator 5 is calculated (at Step S134). In this state, more specifically, the applied side frictional engagement device (i.e., the applied side brake) begins to have the torque capacity so that the speed changes. This torque control in the inertia phase has a tendency for the output shaft torque To to rise on the basis of the inertia torque. Therefore, the output torque of the second motor generator 5 is reduced and corrected.

After this, it is judged (at Step S135) whether or not the decision of the shifting end is satisfied. This shifting end can be decided by that the speed of the predetermined rotary member such as the second motor generator 5 has reached the synchronous speed according to the gear ratio after the gear shift or that the difference from the synchronous speed is within a predetermined value.

In case the answer of Step S135 is NO, the shifting state is still in the inertia phase. Therefore, the routine advances to Step S123 for executing the torque correction of the second motor generator 5 in the inertia phase thereby to output the correction amount Tmadj of the torque of the second motor generator 5. In short, the torque of the second motor generator 5 is reduced and corrected.

In case the answer of Step S135 is YES because the decision of the shifting end is satisfied, on the contrary, the correction amount Tmadj of the torque is set to zero (at Step S136) thereby to end of the torque correction of the second motor generator 5, as accompanying the gear shift. And, the correction amount Tmadj is outputted (at Step S123).

Figure 10:
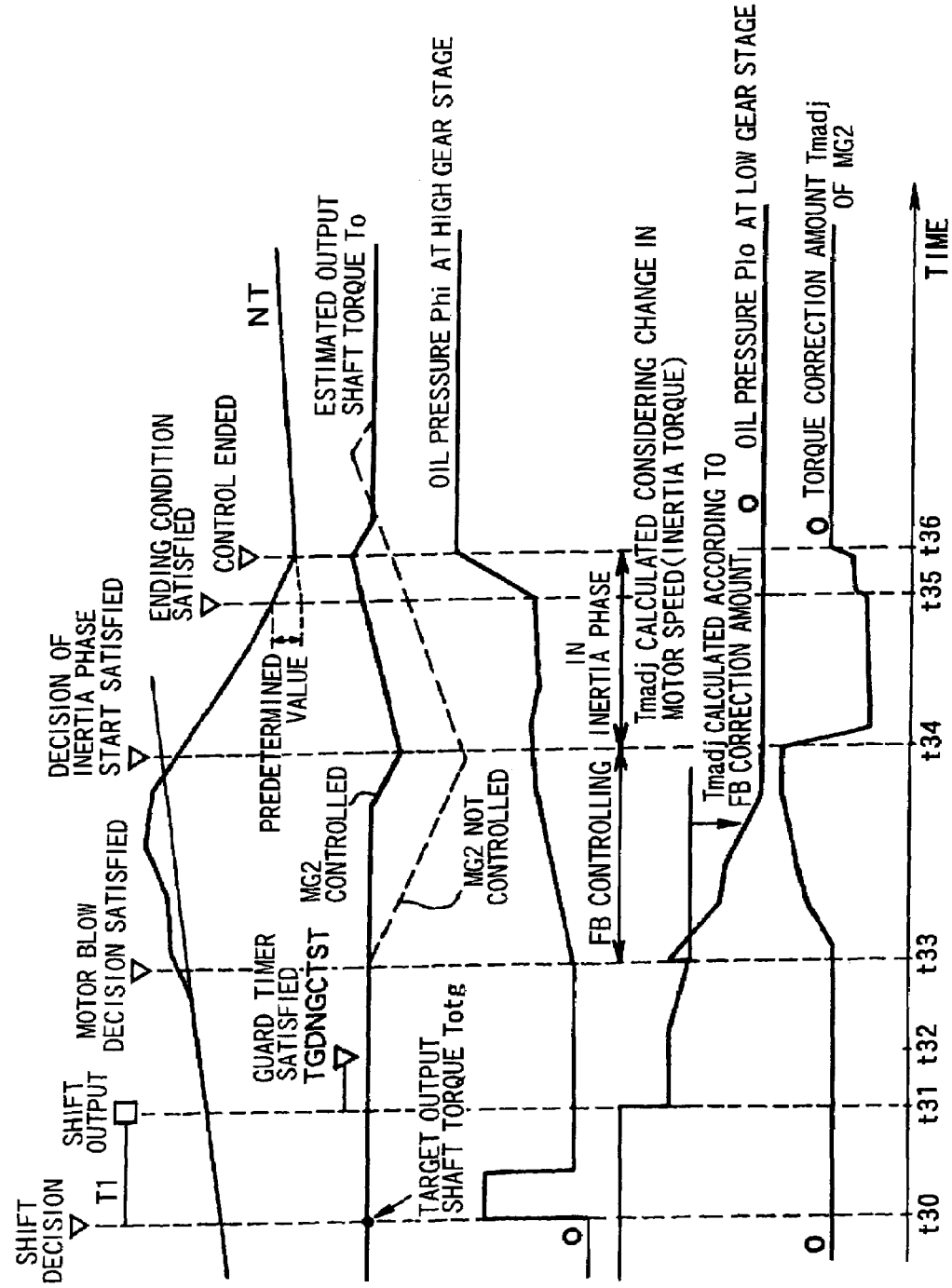
FIG. 10 is a schematic time chart of the case, in which the control is executed at the time of an upshift.

The time chart of the case, in which the control shown in FIG. 9 is made, is schematically shown in FIG. 10. FIG. 10 shows an example of the case of shifting the speed from the low gear stage L to the high gear stage H. If the decision of the gear shift to the high gear stage H is satisfied at a point of time t30 when the vehicle is running at the low gear stage L, the oil pressure (i.e., the high gear stage oil pressure) Phi of the first brake B1 for setting the high gear stage H is temporarily raised and then kept at a predetermined low level. In short, there are executed the fast fill for reducing the pack clearance and the oil pressure control for the subsequent standby. Simultaneously with this, moreover, the estimated output shaft torque at the time of judging the gear shift is stored as the target value Totg.

When the predetermined time period T1 elapses, a shift signal is outputted so that the oil pressure of the second brake B2 (i.e., the low gear stage oil pressure) Plo having set the low gear stage L is stepwise lowered to a predetermined level (at a point of time t31). When the measurement of the guard timer is started from the point of time t31 so that the counting time reaches a time predetermined as a guard value (at a point of time t32), it is decided that the guard timer is satisfied. After this, the low gear stage oil pressure Plo is gradually lowered so that the second brake B2 begins to slide at the instant when the torque inputted from the second motor generator 5 becomes relatively higher than the torque capacity of the second brake B2. As a result, the speed of the second motor generator 5 begins to increase with respect to the speed at the low gear stage L. This is the phenomenon called the "motor blow".

As the low gear stage oil pressure Plo lowers because of the power-on state, the speed NT of the second motor generator 5 rises over the synchronous speed at the low gear stage. When this rise exceeds a predetermined threshold, the motor blow decision is satisfied (at a point of time t33). Simultaneously with this, the feedback control (i.e., the FB control) of the low gear stage oil pressure Plo is started. On the basis of the feedback control amount, moreover, the torque correction control of the second motor generator 5 is executed. Almost simultaneously with this, moreover, the high gear stage oil pressure Phi is gradually raised.

The feedback control of the low gear stage oil pressure Plo keeps the second brake B2 on the released side in a slightly sliding state so that the oil pressure Plo gradually lowers. Accordingly, the torque correction amount Tmadj of the second motor generator 5 is gradually increased. Therefore, the torque of the second motor generator 5 is raised to compensate the fall of the torque capacity at the transmission 6 so that the output shaft torque (i.e., the estimated output shaft torque) To is kept substantially at its target value Totg. In the absence of this torque correction of the second motor generator 5, the output shaft torque To falls, as indicated by a broken line in FIG. 10.

The gear shift thus far described is the so-called "clutch-to-clutch" gear shift, in which one frictional engagement device is released whereas the other frictional engagement device is applied. The individual oil pressures (i.e., the apply pressures) are so coordinately controlled that neither the so-called "overlap", in which both the frictional engagement devices are applied more than a predetermined level, nor the so-called "underlap", in which both the frictional engagement devices are released, may excessively occur. In the state where the low gear stage oil pressure Plo has been lowered substantially to zero, therefore, the high gear stage oil pressure Phi rises to a certain level thereby to cause the so-called "engagement interchange" of the frictional engagement devices. At this time, the torque capacity of the transmission 6 greatly lowers in its entirety, and the torque correction amount Tmadj of the second motor generator 5 has substantially reached the upper limit, so that the estimated output shaft torque To falls.

When the torque capacity of the first brake B1 on the applied side is increased to some extent by the rise of the high gear stage oil pressure Phi, the second brake B2 on the side of the low gear stage is substantially released at that point of time. As a result, the speed of the predetermined rotary member such as the second motor generator 5 begins to change toward the synchronous speed at the high gear stage H. Around this time, the estimated output shaft torque To beings to rise according to the inertia torque.

When the speed NT of the second motor generator 5 becomes lower by a predetermined value than the synchronous speed at the low gear stage L before the gear shift, the decision of the inertia phase is satisfied (at a point of time t34). Thus, there end the feedback control of the low gear stage oil pressure Plo in the torque phase from the point of time t33 to the point of time t34 and the torque correction control of the second motor generator 5, as based on the feedback control. In place of this, there is executed in the inertia phase the torque correction control of the second motor generator 5, which considers the inertia torque based on the speed change of the second motor generator 5. Therefore, the torque of the second motor generator 5 is reduced and corrected.

Therefore, the inertia torque, as caused by the change in the speed, is absorbed by the second motor generator 5, and the estimated output shaft torque To is returned up to the target value Totg. At this time, the torque is prevented from highly fluctuating. After this, the speed NT of the second motor generator 5 approaches the synchronous value at the high gear stage H after the gear shift so that its speed difference becomes the predetermined value or less (at a point of time t35). At this time, the shift ending condition is satisfied, and the high gear stage oil pressure Phi is abruptly raised so that the aforementioned speed NT becomes equal to the synchronous value, and the torque correction control of the second motor generator 5 is ended (at a point of time t36).

Thus according to the control device of this invention, at the gear shifting time of the transmission 6 connected to the input side of the second motor generator 5, the torque of the second motor generator 5 is raised and corrected in the torque phase, and the torque of the second motor generator is lowered and corrected considering the inertia torque. As a result, the fall of the output shaft torque during the shifting operation and the overshoot at the shift ending point of time are lightened. In short, the shocks can be prevented or suppressed by suppressing the fluctuation of the output shaft torque accompanying the gear shift. Especially in the so-called "clutch-to-clutch" shifting operation, it is necessary to control the apply pressures of the frictional engagement devices to participate in the gear shift, in a manner to coordinate with each other. Even in case the time period needed for the gear shift is relatively long, therefore, the shocks can be prevented or suppressed by reducing the fall or fluctuation of the output shaft torque effectively.

Here will be briefly described the relations between the aforementioned specific example and this invention. The means (i.e., the inverter 28, the batter 29, the electronic control unit (MG2-ECU) 30) for the aforementioned control of Step S131 and Step S134 shown in FIG. 9 corresponds to an assist torque corrector or assist torque correcting means of this invention.

According to the aforementioned controls shown in FIG. 1, the torques of the individual motor generators 5 and 11 are controlled to compensate the output shaft torque during the shifting operation. This control is premised by estimating the braking torque (at Step S6) on the basis of the apply pressures of the individual brakes B1 and B2 and their command values. In short, it is premised that the apply pressure and the braking torque correspond to each other. In the control device or controlling method of this invention, therefore, the learning controls shown in FIG. 11 and FIG. 12 are executed to make precise the relations between the apply pressures and the braking torques (or torque capacities).

Figure 11:
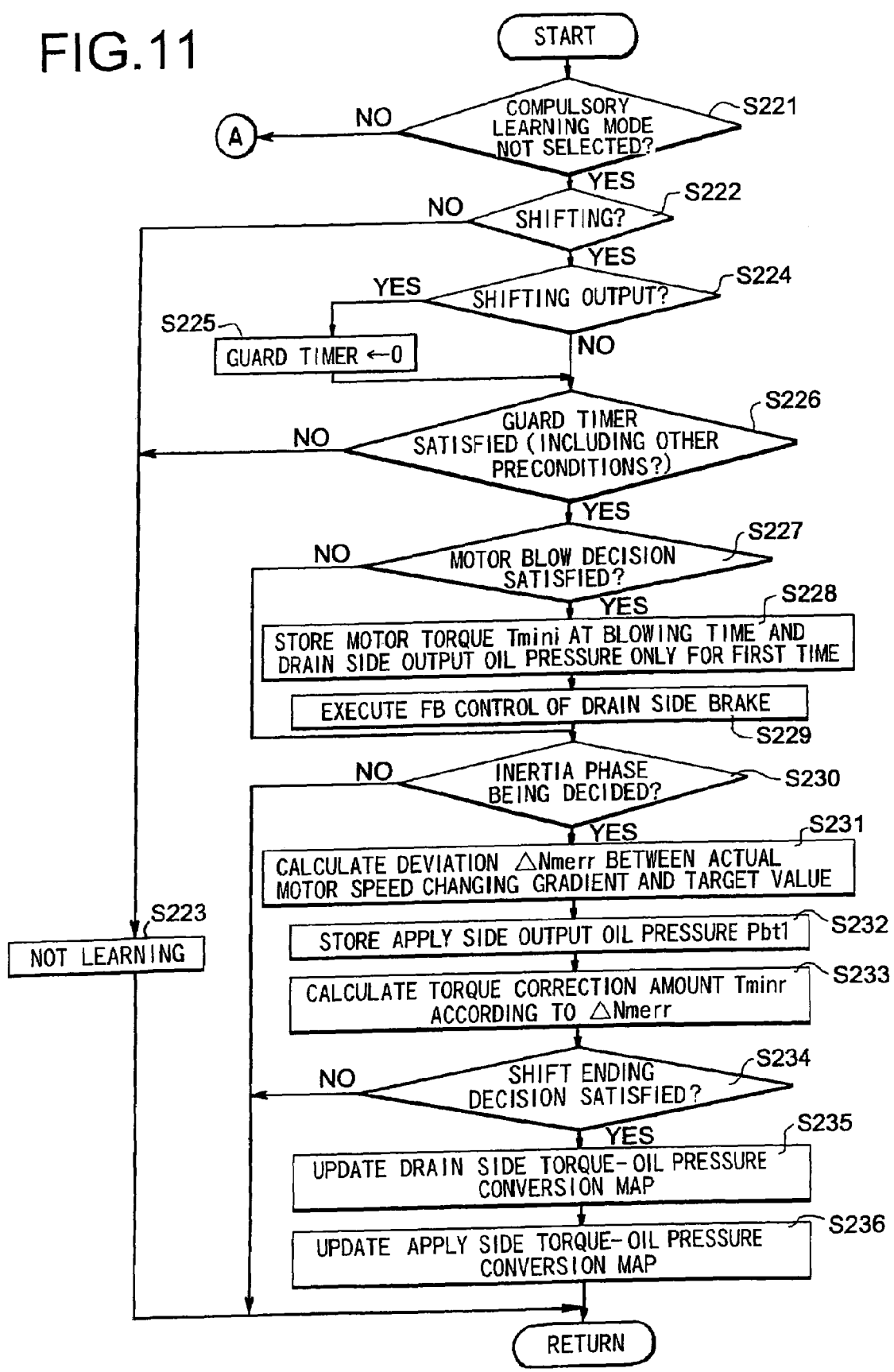
FIG. 11 is a flow chart for explaining an example of a learning control during a shifting by the control system of this invention.
Figure 12:
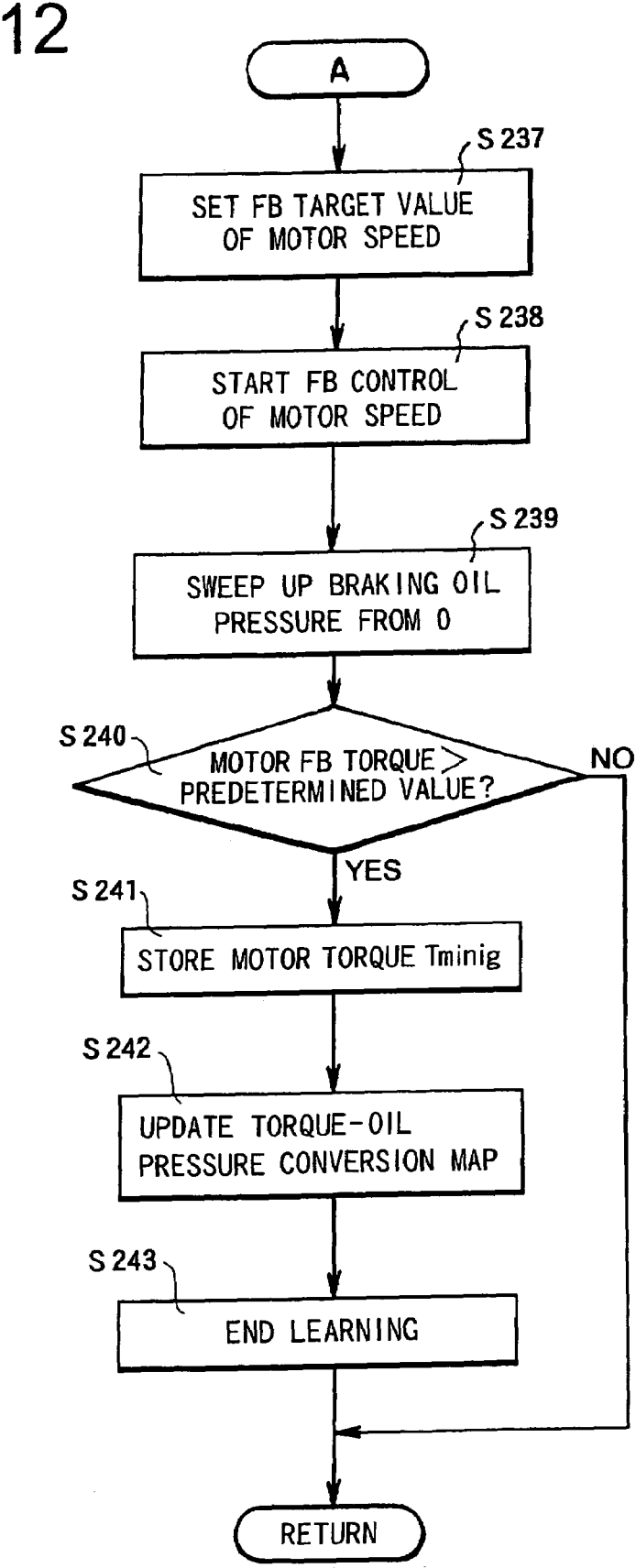
FIG. 12 is a flow chart for explaining a control example of a compulsory learning by the control system of this invention.

First of all, the learning control example shown in FIG. 11 is constructed such that the learning is done at the gear shifting time. It is judged (at Step S221) whether or not the learning mode is selected at the shifting time, that is, whether or not the compulsory learning mode of only learning is not selected. The compulsory learning mode will be described hereinafter.

In case the answer of Step S221 is YES, it is judged (at Step S222) whether or not the transmission is being shifted. Like the judgment of the gear shift at the ordinary vehicular automatic transmission, the judgment of the gear shift at the transmission 6 is made on the basis of the shifting map adopting the vehicle speed or the output shaft speed, the accelerator opening and the drive demand as the parameters. It is, therefore, possible to make the judgment of Step S222 because the judgment of the shifting is satisfied or because the control is started following the satisfaction of that judgment.

In case the answer of Step S222 is NO, that is, in case the transmission is not during the shifting operation, the learning is not done (at Step S223). This Step S223 is the so-called "learning inhibiting step" so that a flag for inhibiting the learning control is turned ON, for example. After this, the routine is returned.

In case the answer of Step S222 is YES because of being shifted, on the contrary, it is judged (at Step S224) whether or not the control signal for the gear shift has been outputted. This control signal is one to start the speed substantially by lowering the apply pressure of the frictional engagement device, which has been applied to set the gear stage before the shifting operation. If there is a shifting output at the judging time at Step S224, the answer of Step S224 is YES. If the shifting output was already made, the answer of Step S224 is NO. In case the answer of Step S224 is YES, moreover, the timer for measuring the shifting sequence (i.e., the guard timer) is reset to zero (at Step S225) and is started. After this, it is judged (at Step S226) whether or not the guard timer has been satisfied, that is, whether or not a predetermined time period has elapsed from the starting time of the guard timer.

In case the answer of Step S224 is NO because the shifting output was already made, on the contrary, the guard timer has already been started, and the routine instantly advances to Step S226, at which it is judged whether or not a predetermined time period has elapsed from the starting time of the guard timer. The reason why the lapse of the predetermined time period was judged at Step S226 is to prevent the erroneous learning of the case, in which the oil pressure failed just after the start of the gear shift so that the torque capacity was extremely lowered. Here at Step S226, there may be additionally judged the satisfaction of the preconditions for the learning, such as that the driving force is not abruptly changed, that the oil temperature is at a predetermined level or higher, or that the control device has not failed.

In case the answer of Step S226 is NO, therefore, the situation does not allow the learning control to be executed, so that the routine advances to Step S223, at which the learning is inhibited. In case the answer of Step S226 is YES, on the contrary, it is judged (at Step S227) whether or not the decision of the motor blow has been satisfied.

In the aforementioned transmission 6, the gear shift is executed by the so-called "engagement interchange", in which one brake B1 (or B2) is released whereas the other brake B2 (or B1) is applied. In the gear shift in the power-on state where the second motor generator 5 is outputting the torque, therefore, the torque having acted to suppress the rotation of the second motor generator 5 falls as the torque capacity of the brake on the released side (or on the drain side) drops. Therefore, the speed of the second motor generator 5 becomes higher than that according to the gear ratio at that point of time. Therefore, this judgment of Step S227 can be made by judging whether or not the speed Nm of the second motor generator 5 satisfies the following conditions:

at Upshift: $Nm > No \cdot \gamma low + \alpha$;

and at Downshift: $Nm > No \cdot \gamma hi + \alpha$.

Here, No: the speed of the output shaft 2, γlow: the gear ratio of the low gear stage L, γhi: the gear ratio of the high gear stage H, and alpha: a predetermined small value.

In case the decision of the blow of the speed of the second motor generator 5 is satisfied so that the answer of Step S227 is YES, and only at a first decision satisfaction, there are stored the torque Tmini of the second motor generator 5 at the blowing time and the output oil pressure Pbt for the drain side brake. Therefore, the torque capacity of the drain side brake and the torque of the second motor generator 5 correspond to each other so that the relation between the oil pressure Pbt of the drain side brake and its torque capacity is defined.

Next, the feedback (FB) control of the drain side brake is executed (at Step S229). In order that the speed of the second motor generator 5 may be larger by a predetermined value than the speed determined on the basis of the gear ratio before the gear shift, more specifically, the apply pressure of the drain side brake is controlled on the basis of the speed difference detected.

Next, it is judged (at Step S230) whether or not the inertia phase has been started, that is, whether or not the inertia phase is being decided. Here in case the answer of Step S227 is NO, the routine instantly advances to Step S230.

As the apply pressure of the brake having set the gear ratio before the gear shift is gradually lowered by the aforementioned feedback control, the speed of the predetermined rotary member including the second motor generator 5 begins to change toward the speed corresponding to the gear ratio after the gear shift, so that the accompanying inertia torque appears as the output shaft torque. This state is the inertia phase, which can be decided, like the decision of the inertia phase in the ordinary vehicular automatic transmission, depending on that the speed Nm of the second motor generator 5 satisfies the following conditions:

at Upshift:$Nm>No.\cdot\gamma low-\beta$ (wherein $\beta$: a predetermined value);

and at Downshift:$Nm>No.\cdot\gamma hi++\beta$ (wherein $\beta$: a predetermined value).

In case the inertia phase is not started so that the answer of Step S230 is NO, the routine is returned to continue the preceding control state. In case the inertia phase is started so that the answer of Step S230 is YES, on the contrary, there is calculated (at Step S231) a deviation $\Delta$Nmerr between the changing gradient of the actual speed of the second motor generator 5 and the changing gradient preset as the target value. This deviation $\Delta$Nmerr corresponds to the difference between the supposed value of the torque capacity corresponding to the apply pressure at that time and the actual torque capacity. Here, the changing gradient of the actual speed of the second motor generator 5 can adopt the average value within a predetermined time period after the start of the inertia phase.

The inertia phase is established as a result that the apply pressure of the drain side brake sufficiently lowers whereas the apply pressure of the engage side (or apply side) brake for setting the gear ratio after the gear shift rises. Therefore, the output oil pressure Pbt1 on the apply side is stored (at Step S232). This output oil pressure Pbt1 to be adopted can be averaged, like the changing gradient of the speed of the second motor generator 5, within a predetermined time period after the start of the inertia phase.

Therefore, the torque capacity, which is actually generated by the apply pressure thus detected of the apply side brake, is different by a torque capacity corresponding to the deviation $\Delta$Nmerr from the torque capacity estimated in advance for that apply pressure. Therefore, the correction amount Tmimr of the torque capacity, as corresponding to the output oil pressure Pbt1, is calculated according to the aforementioned deviation $\Delta$Nmerr (at Step S233). Thus, there is established the relation between the apply pressure and the torque capacity for the frictional engagement device on the apply side.

Next, it is judged (at Step S234) whether or not the decision of the shifting end is satisfied. The end of the gear shift can be decided from the fact that the speed of the predetermined rotary member such as the second motor generator 5 has reached the synchronous value according to the gear ratio after the gear shift or that the difference from the synchronous speed is within a predetermined value.

In case the answer of Step S234 is NO, the routine is returned to continue the preceding controls. During the gear shift, therefore, the relation between the oil pressure on the apply side and the torque capacity may be calculated a plurality of times. In case the answer of Step S234 is YES, on the contrary, the torque-oil pressure conversion map on the drain side brake is updated (at Step S235) on the basis of the motor torque Tmini and the drain side output oil pressure Pbt, as stored at Step S228. In short, the relation between the apply pressure and the torque capacity is learned. On the drain side frictional engagement device, the apply pressure and the torque capacity are directly determined so that the control of Step S235 can also be said as the new preparation of the map.

On the basis of the torque correction amount Tminr calculated at Step S233, moreover, there is updated (at Step S236) the torque—oil pressure conversion map on the apply side brake. In short, there is learned the relation between the apply pressure and the torque capacity on the apply side frictional engagement device.

Next, the compulsory learning will be described with reference to FIG. 12. The compulsory learning to be described hereinafter is a control to determine the relation of the frictional engagement device between the apply pressure and the torque capacity from the data obtained in the actual action, so that the action may be done for the learning. Therefore, the control shown in a flow chart in FIG. 12 is executed in the state where the vehicle having the aforementioned hybrid drive unit mounted thereon is not running, such as the state before the vehicle is shipped from the factory or carried for an inspection to the inspection factory, where the compulsory learning mode switch (although not shown) is operated before the vehicle is started from the garage, or in case the stop state continues for a predetermined time or longer when the parking range detected by the drive range switch (although not shown) continues.

Step S237 shown in FIG. 12 is executed in case the answer of aforementioned Step S221 in FIG. 11 is NO. Specifically, the feedback target value of the motor speed or the speed of the second motor generator 5 is set. On the basis of that target value, moreover, the speed of the second motor generator 5 is feedback-controlled (at Step S238). In other words, the current and/or voltage of the second motor generator 5 are controlled to keep the target speed.

In this state, the oil pressure (or the apply pressure) of either of the brake B1 or B2 to learn is gradually raised (or swept up) from zero (at Step S239). When the apply pressure of either brake rises, the transmission torque between the second motor generator 5 and the output shaft 2 rises so that the torque acts on the second motor generator 5 in the direction to stop its rotation. On the other hand, the speed of the second motor generator 5 is feedback-controlled so that its feedback torque gradually rises.

At Step S240, it is judged whether or not the feedback torque of the second motor generator 5 exceeds a predetermined value. In case the answer of Step S240 is NO, the routine is returned to continue the preceding controls. In case the answer of Step S240 is YES, on the contrary, the torque Tminig of the second motor generator 5 is stored (at Step S241).

As described hereinbefore, the output torque of the second motor generator 5 corresponds to the torque capacity of the frictional engagement device in the transmission 6, and the output torque of the second motor generator 5 is detected electrically precisely in terms of a current value, so that the torque capacity of the frictional engagement device in the transmission 6 can be precisely detected through the control contents of the second motor generator 5. On the other hand, the apply pressure of the frictional engagement device (or the brake) is known because it is controlled at Step S239.

On the basis of the oil pressure in the control of Step S239 and the motor torque Tminig stored at Step S241, therefore, there is updated (or learned) (at Step S242) the torque—oil pressure conversion map on the brake targeted. After this, ending control of learning is executed (at Step S243).

Here, the friction coefficient of the friction member in the frictional engagement device such as the aforementioned brake B1 or B2 may vary in response to the sliding velocity, and the so-called "$\mu$-V characteristics", as expressed by the friction coefficient $\mu$ and the sliding velocity V, may be different for each frictional engagement device. Therefore, the learning control, as shown in FIG. 12, may be executed for each target speed by setting a plurality of target values (or target speeds) at Step S237. Alternatively, the level of the oil pressure at Step S239 is changed so that it may be learned for each of the points.

Figure 13:
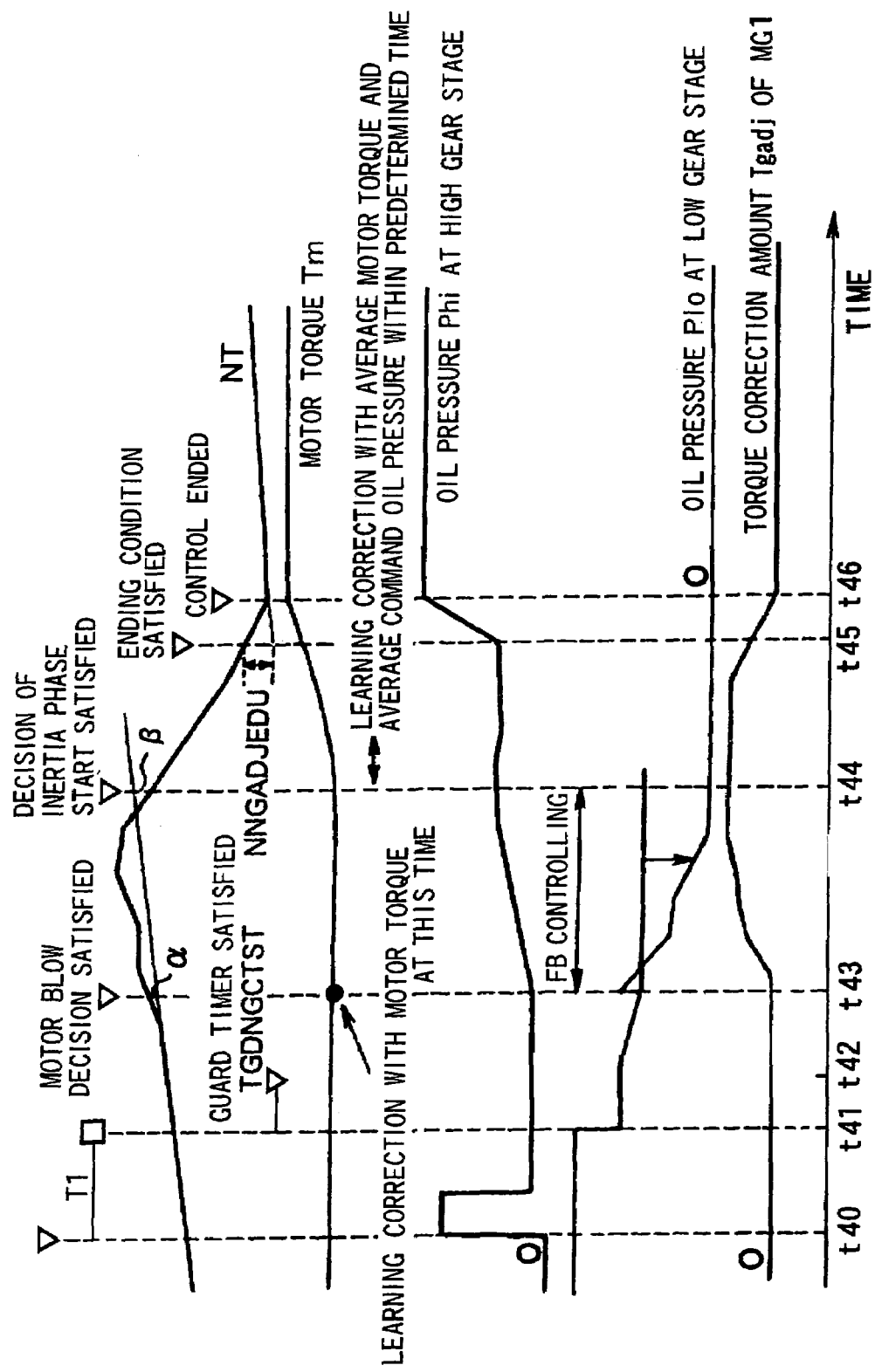
FIG. 13 is a time chart for explaining an example of the learning control during a shifting.

The time chart of the case, in which the aforementioned learning control is made during the gear shift from the low gear stage L to the high gear stage H, is shown in FIG. 13. When the judgment of the gear shift to the high gear stage H is satisfied at a point of time t40, at which the vehicle is running at the set low gear stage L, the oil pressure (i.e., the high gear stage side oil pressure or the apply side oil pressure) Phi of the first brake B1 for setting the high gear stage H is temporarily raised and is then kept at a predetermined low pressure. In other words, there are executed the fast fill for reducing the pack clearance and the oil pressure control for the subsequent low-pressure standby. When the predetermined time period T1 then lapses, the shifting signal is outputted so that the oil pressure (i.e., the low gear stage side oil pressure or the drain side oil pressure) Plo of the second brake B2 having set the low gear stage L is stepwise lowered (at a point of time t41).

When the measurement of the guard timer is started from the point of time t41 so that the counted time reaches one predetermined as the guard value (at a point of time t42), the satisfaction of the guard timer is decided. Simultaneously with this, the control for torque compensation at the gear shifting time is started, and the motor blow is then decided.

As the low gear stage side oil pressure Plo drops because of the power-on state, there occurs the so-called "motor blow", in which the speed NT of the second motor generator 5 grows higher than the synchronous speed at the low gear stage. This motor blow is decided, as described hereinbefore, from that the increase in the synchronous speed exceeds the predetermined value α. On the basis of the torque (i.e., the motor torque Tm) of the second motor generator 5 at a point of time t43 for the satisfaction of the decision and the oil pressure of the second brake B2, there is learned the relation between the apply pressure and the torque capacity on the second brake B2.

From this point of time t43, moreover, there is started the feedback control (or the FB control) of the low gear stage side oil pressure (i.e., the apply pressure of the second brake B2). More specifically, the low gear stage side oil pressure Plo is controlled to keep the speed (i.e., the so-called "blow speed") exceeding the synchronous speed of the second motor generator 5, at a predetermined value. In addition, the high gear stage side oil pressure Phi is gradually raised.

Moreover, the second brake B2 having set the low gear stage L is gradually released so that the torque control of the first motor generator 11 constructing the main prime mover 1 is executed to compensate the accompanying output shaft torque. Specifically, the regenerative torque by the first motor generator 11 is raised to raise the torque of the output shaft 2. In FIG. 13, the correction amount of the torque of the first motor generator 11 is indicated by the torque correction amount Tgadj of the MG1.

The low gear stage side oil pressure Plo drops, and the high gear stage side oil pressure Phi gradually rises, so that the speed NT of the rotary member such as the second motor generator 5 relating to the transmission 6 begins to change toward the synchronous speed at the high gear stage H. When the speed becomes lower by a predetermined value β than the synchronous speed at the low gear stage L, the decision of the start of the inertia phase is satisfied at a point of time t44.

In this inertia phase, the output torque of the second motor generator 5 is raised and controlled to cope with the drop in the gear ratio. The gradient of the rise, i.e., the average value of the torques for a predetermined time period is determined. In addition, there is determined the average value of the high gear stage side oil pressure Phi for a predetermined time period. On the basis of the oil pressure and the motor torque thus determined, there is learned the relation between the torque capacity and the apply pressure of the first brake B1 on the high gear stage side. As has been described with reference to FIG. 11, the learning may be done either by calculating the torque correction value from the deviation between the changing gradient of the actual speed of the second motor generator 5 and the target value and by learning the relation between the torque capacity and the apply pressure on the basis of the calculated value and the oil pressure, or directly by using the motor torque Tm.

When the difference between the speed NT of the predetermined rotary member such as the second motor generator 5 and the synchronous speed determined on the basis of the gear ratio after the gear shift becomes a predetermined value or less, moreover, the ending condition for the gear shift is satisfied (at a point of time t45). Accordingly, the high gear stage side oil pressure Phi is abruptly raised, and the speed NT becomes identical to the synchronous speed. Moreover, the torque compensation by the first motor generator 11 is eliminated, and the motor torque Tm reaches the predetermined value after the gear shift. Thus, the gear shift is ended (at a point of time t46).

Figure 14:
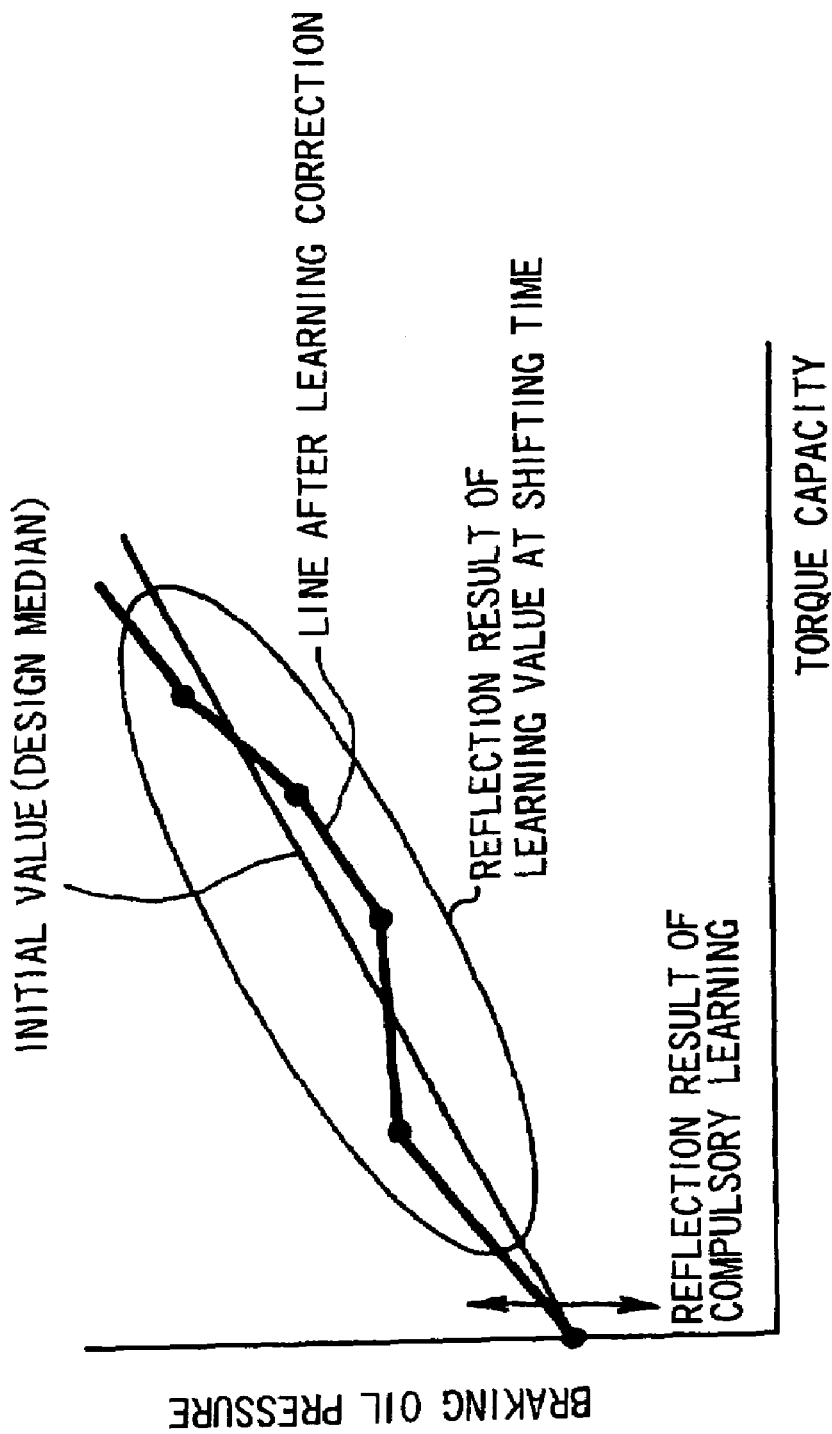
FIG. 14 is a diagram showing a learned torque—oil pressure conversion map schematically.

A relation between the braking oil pressure (or the apply pressure) thus learned by the learning control and the torque capacity is conceptually shown as a map in FIG. 14. The thick solid line indicates the learned value, and the thin solid line indicates a designed initial value (or a design median).

The control device of this invention learns the relation between the torque capacity and the apply pressure of the frictional engagement device in the transmission 6, as described above, and executes the gear shift control of the transmission 6 by making use of the result of the learning. As described with reference to FIG. 1, specifically, the oil pressure during the shifting operation is controlled at Step S5 of FIG. 1, and the braking torque (i.e., the torque capacity of the frictional engagement device to participate in the gear shift) corresponding to the oil pressure is estimated on the basis of the relation obtained by the aforementioned learning, i.e., the torque—oil pressure conversion map. This map is corrected by the learning to correct the errors, which might otherwise be caused by the fluctuations such as the individual difference or the aging. As a result, the braking torque is precisely estimated.

In the case of the gear shift in the so-called "power-on" wherein the second motor generator 5 is outputting the torque, for example, the change in the braking torque appears as the change in the output shaft torque. Therefore, the torque correction control (at Step S7) by the first motor generator 11 is executed to compensate the fall in the output shaft torque at the shifting time, and the output torque of the second motor generator 5 is likewise corrected (at Step S8) to compensate the fall in the output shaft torque. These corrections of the torques of the individual motor generators 5 and 11 are basically executed to correspond to the changing amount of the output shaft torque, i.e., the aforementioned braking torque. However, the control data to be used is the braking oil pressure so that the correction amount of the torque is actually determined on the basis of the braking oil pressure. In the aforementioned control device according to this invention, the torque—oil pressure conversion map of the brake is then learned and corrected, and the relation between the torque and the apply pressure is precisely determined so that the torque correction amounts of the individual motor generators 5 and 11 on the basis of the braking oil pressure are precise. As a result, it is possible to prevent or suppress the deterioration of the shocks accompanying the gear shift.

Here will be briefly described the relations between the aforementioned specific example and this invention. The means (i.e., the electronic control unit (MG2-ECU) 30 and the electronic unit (T-ECU) 21) for performing the controls the Steps S227, S232, S233, S235, S236, S239, S241 and S242 shown in FIG. 11 and FIG. 12 corresponds to a learning device or learning means of this invention, and the means (i.e., the electronic control unit (MG1-ECU) 16, the electronic control unit (MG2-ECU) 30 and the electronic control unit (T-ECU) 27) for performing the controls of Steps S7 to S11 shown in FIG. 1 corresponds to a shift controller or shift control means, or a torque controller or torque control means of this invention.

Here, this invention should not be limited to the aforementioned specific examples. For example, the transmission of this invention should not be limited to the one which is constructed of the aforementioned Ravignaux type planetary gear mechanism. In short, the transmission may be a device capable of changing the gear ratio between the output member and the prime mover for outputting the torque to be applied to the former. In the aforementioned specific example, moreover, there has been enumerated the transmission for executing the gear shift by the so-called "clutch-to-clutch" gear shift. In this invention, however, it is possible to adopt the transmission for executing the gear shift in a mode other than the clutch-to-clutch gear shift.

Moreover, the main prime mover in this invention should not be limited to the power unit, which is constructed of the internal combustion engine and the motor generator connected to each other through the planetary gear mechanism. In short, it is sufficient that the main prime mover can output the power to the output member such as the output shaft. Moreover, the aforementioned specific examples have been described in connection with the motor generator, which is provided with the functions of an electric motor and a generator. However, one drive unit constructing the main prime mover in this invention may be exemplified by an electric motor and/or a dynamo, and the assist prime mover may also be exemplified by an electric motor and/or a dynamo.

Still moreover, the aforementioned specific examples are constructed such that the torque correction by the main prime mover or the first motor generator is made on the so-called "real time" on the basis of the information detected at each point of time. In this invention, however, the construction may be modified such that the torque correction is made by outputting a predetermined value in accordance with the progressing degree of the gear shift.

And, the transmission, to which this invention is applied, is properly exemplified by the transmission in the so-called "mechanical distribution type hybrid drive unit, in which the torque of the internal combustion engine and the torque of the first motor generator (or the electric motor) are transmitted to the output member through a synthesis distribution mechanism composed mainly of the planetary gear mechanism, as shown in FIG. 15, and in which the torque of the second motor generator (or the electric motor) is transmitted to that output member through the transmission. However, the transmission of the invention may have another construction. In short, the transmission, in which the electric motor is connected to the input side so that the gear shift is executed by applying/releasing the frictional engagement device, may be connected to the output member, to which the torque is transmitted from the main prime mover. Moreover, the electric motor in this invention should not be limited to one for outputting the torque but may be a motor generator capable of generating a regenerative torque (or a negative torque) and controlling the torque, as has been exemplified in the foregoing specific example. Moreover, the main prime mover in this invention should not be limited to the construction composed mainly of the internal combustion engine, the motor generator and the planetary gear mechanism, as has been exemplified in the foregoing specific examples. In short, the main prime mover may be a power unit capable of outputting the torque to the output member such as the output shaft and controlling the torque. Moreover, the frictional engagement device in this invention may be not only the aforementioned brake but also a clutch for transmitting the torque with the frictional force.

According to the control device or controlling method of this invention, as has been described hereinbefore, in case the gear shift is done in the transmission, the transmission torque between the assist prime mover and the output member drops so that the torque of the main prime mover is corrected according to the drop of the transmission torque. Therefore, the shocks can be prevented or reduced by suppressing the fluctuation of the torque of the output member, as might otherwise accompany the gear shift, of the torque of the output member.

According to the control device or controlling method of this invention, moreover, when the gear shift is executed by the transmission, the torque of the first motor generator is corrected, and the torque of the output member is corrected by the torque change including the inertia torque according to the accompanying rotation change. Even if the torque to be transmitted between the second motor generator and the output member changes, therefore, the torque change of the output member is prevented or suppressed. As a result, it is possible to prevent or reduce the shocks accompanying the gear shift.

According to the control device or controlling method of this invention, moreover, in case the torque of the first motor generator is corrected during the gear shift, the torque of the internal combustion engine is additionally corrected. Even if there is a change in either the torque of the first motor generator to act on the internal combustion engine through the gear mechanism, or in the reaction based on the torque, it is possible to prevent or suppress the change in the speed of the internal combustion engine.

According to the control device or controlling method of this invention, moreover, the torque of the first motor generator is corrected according to the gear shift in the transmission between the assist prime mover and the output member so that the speed of the internal combustion engine accordingly drops. Simultaneously as the inertia torque accompanying the speed change occurs, the torque to be outputted by the internal combustion engine itself rises so that the torque change of the output member accompanying the gear shift in the transmission can be prevented or suppressed to facilitate the control.

According to the control device or controlling method of this invention, moreover, the torque to be transmitted from the main prime mover to the output member is corrected on the basis of the torque capacity of the frictional engagement device to execute the gear shift so that the change in the torque of the output member is prevented or suppressed. As a result, it is possible to prevent or reduce the shifting shocks.

According to the control device or controlling method of this invention, still moreover, in the case of the so-called "power-on upshift" in the transmission, the apply pressure of the frictional engagement device is so feedback-controlled that the speed of the assist prime mover may be one to be set in the slightly sliding state of the frictional engagement device to participate in the gear shift, and the torque to be transmitted from the main prime mover to the output member is corrected on the basis of the feedback correction amount. Therefore, the influence of the dispersion in the characteristics of the frictional engagement device is reduced to improve the precision of the torque fluctuation suppressing control of the output member, i.e., the suppressing control of the shifting shocks.

According to the control device or controlling method of this invention, still moreover, the torque of the output member is estimated on the basis of the torque capacity of the frictional engagement device for executing the gear shift in the transmission, and the deviation between the estimated output torque and the target output torque is determined so that the torque to be transmitted from the main prime mover to the output member is corrected on the basis of that deviation. Therefore, the output torque during the gear shift is kept at the target torque so that the shocks accompanying the gear shift in the transmission can be effectively prevented or suppressed.

According to the control device or controlling method of this invention, on the other hand, after the inertia phase by the gear shift in the transmission was started, the torque to be transmitted from the main prime mover to the output member is corrected on the basis of the progressing state of the gear shift such as the degree of the rotational change, so that the torque to be transmitted from the main prime mover to the output member can be precisely corrected to prevent or reduce the shocks. In case the gear shift proceeds to some extent and arrives at the shift ending time, moreover, it is possible to control the torque correction on the basis of that fact, and it is easy to control the torque correction of the main prime mover.

According to the control device or controlling method of this invention, still moreover, the time period from the shifting start of the so-called "power-on upshift" to the start of the inertia phase is learned, and the torque to be transmitted from the main prime mover to the output member is corrected on the basis of the learned value. Therefore, the timing and/or the correction amount of the correction accompanying the gear shift of the torque to be transmitted from the main prime mover to the output member can be optimized to prevent or reduce the shocks accompanying the gear shift precisely.

According to the control device or controlling method of this invention, moreover, the time period from the inertia phase start in the gear shift of the so-called "power-on upshift" to the shift end is learned, and the torque to be transmitted from the main prime mover to the output member is corrected on the basis of the learned value. Therefore, the timing and/or the correction amount of the correction accompanying the gear shift of the torque to be transmitted from the main prime mover to the output member can be optimized to prevent or reduce the shocks accompanying the gear shift precisely. In case the gear shift proceeds to some extent and reaches the shift ending time, moreover, it is possible to control the torque correction on the basis of that fact, and it is easily to control the torque correction of the main prime mover.

According to the control device or controlling method of this invention, still moreover, the torque of the internal combustion engine is corrected on the basis of the torque correction amount of the first motor generator during the gear shift so that the torque of the internal combustion engine connected thereto through the gear mechanism is controlled to a proper value according to the torque of the first motor generator. As a result, the precision of the correction control of the torque of the output member can be improved to prevent or reduce the shocks and to suppress or avoid the change in the speed of the internal combustion engine.

According to the control device or controlling method of this invention, moreover, in the state where the torque appearing in the output member is substantially zero, the gear shift for the torque acting on the transmission to change positively and negatively, that is, the gear shift for the tooth surfaces of the gears to contact/leave is inhibited. Therefore, it is possible to avoid or reduce the so-called "rattling noises" in the transmission.

According to this invention, on the other hand, even if the transmission torque capacity of the transmission changes according to the gear shift in the transmission, the torque of the assist prime mover connected to the input side of the transmission is corrected to compensate the change of the torque in the output member, so that the fluctuation of the torque in the output member is prevented. As a result, it is possible to prevent or suppress the fluctuation or fall of the torque accompanying the gear shift.

According to this invention, moreover, the torque of the assist prime mover is corrected to the rising side before the start of the inertia phase so that the fall of the torque to be outputted from the transmission to the output member is suppressed or prevented. As a result, it is possible to prevent or suppress the fluctuation or fall of the torque, as might otherwise accompany the gear shift in the transmission.

According to this invention, moreover, in the inertia phase at the shifting time in the transmission, there occurs the inertia torque accompanying the change in the speed of the predetermined rotary member, and the inertia torque acts on the output member so that the torque of the assist prime mover is reduced and corrected. As a result, it is possible to prevent or suppress the fluctuation or fall of the torque accompanying the gear shift in the transmission.

According to this invention, still moreover, the transmission torque capacity of the transmission at the gear shifting time changes in relation to the torque capacity of the frictional engagement device, and the torque of the assist prime mover is controlled on the basis of either the torque capacity of the frictional engagement device or the control amount relating to the torque capacity. Therefore, the fluctuation or fall of the torque of the output member at the shifting time of the transmission can be prevented or suppressed more precisely.

According to this invention, moreover, at the shifting initial time in the transmission, the released side frictional engagement device is gradually released while being accompanied by the slide, and its torque capacity is reduced. Accordingly, the torque of the assist prime mover is raised and corrected so that the torque to be transmitted from the transmission to the output member is hardly changed. As a result, it is possible to prevent or suppress the fall of the torque of the output member at the initial shifting time and the accompanying fluctuation or fall of the torque.

According to this invention, still moreover, the torque capacity in the state where the predetermined apply pressure acts on the frictional engagement device is determined on the basis of the torque of the assist prime mover, and the relation between the apply pressure and the torque capacity of the frictional engagement device is learned so that the gear shift in the transmission is controlled on the basis of the learning result. Therefore, the output torque of the transmission, on which the torque capacity of the frictional engagement device reflects, can be controlled as expected, to prevent or suppress the deterioration of the shocks.

According to this invention, moreover, the torque of the output member is varied with the torque capacity of the frictional engagement device constructing the transmission, and the torque capacity is learned as the relation to the apply pressure so that the torque of the assist prime mover or the main prime mover is controlled on the basis of the learning result. In this case, the relation between the apply pressure and the torque capacity is precisely determined so that the torque of the output member can be precisely controlled by controlling the torque of the electric motor or the main prime mover on the basis of the apply pressure at the shifting time. As a result, it is possible to prevent or suppress the deterioration of the shocks.

INDUSTRIAL APPLICABILITY

This invention can be used in not only an automobile but also various vehicles and especially in a hybrid car.

The invention claimed is:

1. A control device of a hybrid drive unit, wherein an assist prime mover is connected through a transmission to an output member, to which a torque outputted by a main prime mover is transmitted, comprising:
    a first torque correcting means for correcting the torque to be transmitted from said main prime mover to said output member during a gear shift by said transmission,
    wherein said main prime mover includes: an internal combustion engine, to which the torque is synthesized or distributed through a gear mechanism for performing a differential action with three rotary elements; and a first motor generator;
    said assist prime mover is constructed of a second motor generator; and
    said first torque correcting means includes a correcting means for correcting the torque by said first motor generator.

2. The control device of a hybrid drive unit of claim 1, wherein:
    said first torque correcting means includes a torque raising means for raising the torque to be transmitted from said main prime mover to said output member.

3. The control device of a hybrid drive unit of claim 1, further comprising:
    a second torque correcting means for correcting the torque of said internal combustion engine when the torque of said first motor generator is corrected during said gear shift.

4. The control device of a hybrid drive unit of claim 3, wherein:
    said second torque correcting means includes a correcting means for raising the torque of said internal combustion engine.

5. The control device of a hybrid drive unit of claim 1, wherein:
    said first torque correcting means includes a correcting means for correcting the torque of said first motor generator in case the running state of said internal combustion engine is in such a region that the output torque of the internal combustion engine falls as the speed of the internal combustion engine increases.

6. The control device of a hybrid drive unit of claim 1, wherein:
    said transmission includes a frictional engagement device for transmitting the torque of said assist prime mover to said output member and for executing a gear shift when applied or released; and
    said first torque correcting means includes a correcting means for correcting the torque to be transmitted from said main prime mover to said output member on the basis of the torque capacity of said frictional engagement device.

7. The control device of a hybrid drive unit of claim 6, wherein:
    said frictional engagement device includes a low speed side frictional engagement device to be released at the time of the gear shift, in which said assist prime mover outputs the torque and reduces a gear ratio; and
    said first torque correcting means includes a correcting means for correcting the torque to be transmitted from said main prime mover to the output member on the basis of a feedback correction amount to feedback-control the apply pressure of said low speed side frictional engagement device so that the speed of said assist prime mover comes to a speed set by a predetermined fine slide of said low speed side frictional engagement device.

8. The control device of a hybrid drive unit of claim 1, wherein:
    said transmission includes a frictional engagement device for transmitting the torque of said assist prime mover to said output member and for executing the gear shift when applied or released; and
    said first torque correcting means includes a correcting means for correcting the torque to be transmitted from said main prime mover to the output member on the basis of a deviation between the torque of said output member, as estimated on the basis of the torque capacity of said frictional engagement device during a gear shift, and a target output torque.

9. The control device of a hybrid drive unit of claim 1, wherein:
    said first torque correcting means includes a correcting means for correcting the torque to be transmitted from said main prime mover to said output member on the basis of the proceeding degree of a gear shift after the start of an inertia phase at said gear shift.

10. The control device of a hybrid drive unit of claim 1, wherein:
    said first torque correcting means includes a correcting means for correcting the torque to be transmitted from said main prime mover to said output member on the basis of a learned value of a time period from the shifting start at the time of a gear shift to reduce the gear ratio of said transmission, while said assist prime mover is outputting the torque, to the start of an inertia phase.

11. The control device of a hybrid drive unit of claim 1, wherein:
    said first torque correcting means includes a correcting means for correcting the torque to be transmitted from said main prime mover to said output member on the basis of a learned value of a time period from the inertia phase start at the time of a gear shift to reduce the gear ratio of said transmission, while said assist prime mover is outputting the torque, to the shifting end.

12. The control device of a hybrid drive unit of claim 3, wherein:
    said second torque correcting means includes a correcting means for correcting the torque of said internal combustion engine on the basis of the torque correction amount of said first motor generator during said gear shift.

13. The control device of a hybrid drive unit of claim 1, wherein:
said transmission is constructed of a gear shift mechanism; and
said control device further comprises a gear shift inhibiting means for inhibiting the gear shift, in which a torque change for the tooth surfaces of gears in said gear shift mechanism to contact/leave each other is caused, while the torque of said output member is substantially zero.

14. The control device of a hybrid drive unit of claim 1, further comprising:
an assist torque correcting means for correcting the torque of said assist prime mover in a direction to suppress the change in the torque of said output member, at the gear shift by said transmission.

15. The control device of a hybrid drive unit of claim 14, wherein:
said assist torque correcting means includes a correcting means for correcting to augment the output torque of said assist prime mover before the start of an inertia phase at the gear shift in said transmission is decided.

16. The control device of a hybrid drive unit of claim 14, wherein:
said assist torque correcting means includes a correcting means for correcting to reduce the output torque of said assist prime mover after the start of an inertia phase at the gear shift in said transmission is decided.

17. The control device of a hybrid drive unit of claim 14, wherein:
said transmission includes a frictional engagement device for executing a gear shift by changing the applied/released state; and
said assist torque correcting means includes a controlling means for controlling the output torque of said assist prime mover coordinately with the control of either the torque capacity of said frictional engagement device or the control amount relating to the torque capacity.

18. The control device of a hybrid drive unit of claim 16, further comprising:
an applied side frictional engagement device to be applied at said gear shift; and a released side frictional engagement device to be released at said gear shift,
wherein said assist torque correcting means includes a correcting means for correcting to augment the output torque of said assist prime mover when said released side frictional engagement device is gradually released while sliding.

19. The control device of a hybrid drive unit of claim 1, further comprising:
a frictional engagement device to be applied/released for setting the gear ratio of said transmission;
a learning means for learning the relation between the torque capacity and the apply pressure of said frictional engagement device on the basis of the torque generated at said assist prime mover and the apply pressure of said frictional engagement device; and
a shift controlling means for controlling the gear shift of said transmission on the basis of the learned result by said learning means.

20. The control device of a hybrid drive unit of claim 18, further comprising:
a learning means for learning the relation between the torque capacity and the apply pressure of said frictional engagement device on the basis of the torque generated at said assist prime mover and the apply pressure of said frictional engagement device,
wherein said shift controlling means includes a controlling means for controlling the torque of either said assist prime mover or said main prime mover during the gear shift by said transmission, on the basis of a learned result by said learning means.

21. The control device of a hybrid drive unit of claim 1, wherein
said main prime mover includes: a gear mechanism for differential actions with three elements of an input element, a reaction element and an output element; an internal combustion engine connected to said input element; and a motor generator connected to said reaction element, of which said output element is connected to said output member.

22. The control device of a hybrid drive unit of claim 1, wherein:
said transmission is constructed of a gear mechanism capable of interchanging the gear ratio at two stages.

23. The control device of a hybrid drive unit of claim 20, wherein:
said gear mechanism includes a Ravignaux type planetary gear mechanism having a single pinion type planetary gear mechanism and a double pinion type planetary gear mechanism in combination.

24. The control device of a hybrid drive unit of claim 20, wherein:
said gear mechanism includes a first sun gear to be selectively fixed by a brake;
a ring gear arranged concentrically of said first sun gear and adapted to be selectively fixed by another brake;
a first pinion gear meshing with said first sun gear;
a second pinion gear meshing with said first pinion gear and said ring gear;
a second sun gear meshing with said second pinion gear and connected to said assist prime mover; and
a carrier holding the individual pinion gears in a manner to rotate on their axes and to revolve therearound and connected to said output member.

25. A control device of a hybrid drive unit, wherein an assist prime mover is connected through a transmission to an output member, to which a torque outputted by a main prime mover is transmitted, comprising:
an assist torque correcting means for correcting the torque of said assist prime mover in a direction to suppress the change in the torque of said output member, at the gear shift by said transmission,
wherein said assist prime mover is constructed by a motor generator.

26. The control device of a hybrid drive unit of claim 25, wherein:
said assist torque correcting means includes a correcting means for correcting to augment the output torque of said assist prime mover before the start of an inertia phase at the gear shift in said transmission is decided.

27. The control device of a hybrid drive unit of claim 25, wherein:
said assist torque correcting means includes a correcting means for correcting to reduce the output torque of said assist prime mover after the start of an inertia phase at the gear shift in said transmission is decided.

28. The control device of a hybrid drive unit of claim 25, wherein:

said transmission includes a frictional engagement device for executing a gear shift by changing the applied/released state; and said assist torque correcting means includes a controlling means for controlling the output torque of said assist prime mover coordinately with the control of either the torque capacity of said frictional engagement device or the control amount relating to the torque capacity.

29. The control device of a hybrid drive unit of claim 27, further comprising:

an applied side frictional engagement device to be applied at said gear shift; and a released side frictional engagement device to be released at said gear shift, wherein said assist torque correcting means includes a correcting means for correcting to augment the output torque of said assist prime mover when said released side frictional engagement device is gradually released while sliding.

30. The control device of a hybrid drive unit of claim 29, further comprising:

a learning means for learning the relation between the torque capacity and the apply pressure of said frictional engagement device on the basis of the torque generated at said assist prime mover and the apply pressure of said frictional engagement device, wherein said shift controlling means includes a controlling means for controlling the torque of either said assist prime mover or said main prime mover during the gear shift by said transmission, on the basis of a learned result by said learning means.

31. The control device of a hybrid drive unit of claim 25, wherein:

said main prime mover includes a gear mechanism for differential actions with three elements of an input element, a reaction element and an output element; an internal combustion engine connected to said input element; and a motor generator connected to said reaction element, of which said output element is connected to said output member.

32. The control device of a hybrid drive unit of claim 30, wherein:

said gear mechanism includes a Ravignaux type planetary having a single pinion type planetary gear mechanism and a double pinion type planetary gear mechanism in combination.

33. The control device of a hybrid drive unit of claim 30, wherein:

said gear mechanism includes a first sun gear to be selectively fixed by a brake; a ring gear arranged concentrically of said first sun gear and adapted to be selectively fixed by another brake; a first pinion gear meshing with said first sun gear; a second pinion gear meshing with said first pinion gear and said ring gear; a second sun gear meshing with said second pinion gear and connected to said assist prime mover; and a carrier holding the individual pinion gears in a manner to rotate on their axes and to revolve therearound and connected to said output member.

34. A control device of a hybrid drive unit, which has a main prime mover transmitting a torque thereof to an output member; a transmission transmitting a torque therethrough from an assist prime mover, which is constructed by a electric motor capable of controlling a torque electrically, to the output member, and has a frictional engagement device for setting a gear ratio in accordance with the applied/released state thereof, comprising:

a learning means for learning the relation between the torque capacity and the apply pressure of said frictional engagement device on the basis of the torque generated at said assist prime mover and the apply pressure of said frictional engagement device; and a shift controlling means for controlling the gear shift of said transmission on the basis of a learned result by said learning means.

35. The control device of a hybrid drive unit of claim 34, wherein:

said shift controlling means includes a controlling means for controlling the torque of either said assist prime mover or said main prime mover during the gear shift by said transmission, on the basis of the learned result by said learning means.

36. The control device of a hybrid drive unit of claim 34, wherein:

said main prime mover includes: a gear mechanism for differential actions with three elements of an input element, a reaction element and an output element; an internal combustion engine connected to said input element; and a motor generator connected to said reaction element, of which said output element is connected to said output member.

37. The control device of a hybrid drive unit of claim 34, wherein:

said transmission is constructed of a gear mechanism capable of interchanging the gear ratio at two stages.

38. The control device of a hybrid drive unit of claim 35, wherein:

said gear mechanism includes a Ravignaux type planetary gear mechanism having a single pinion type planetary gear mechanism and a double pinion type planetary gear mechanism in combination.

39. The control device of a hybrid drive unit of claim 35, wherein:

said gear mechanism includes a first sun gear to be selectively fixed by a brake; a ring gear arranged concentrically of said first sun gear and adapted to be selectively fixed by another brake; a first pinion gear meshing with said first sun gear; a second pinion gear meshing with said first pinion gear and said ring gear; a second sun gear meshing with said second pinion gear and connected to said assist prime mover; and a carrier holding the individual pinion gears in a manner to rotate on their axes and to revolve therearound and connected to said output member.

40. The control device of a hybrid drive unit of claim 37, wherein:

said gear mechanism includes a first sun gear to be selectively fixed by a brake; a ring gear arranged concentrically of said first sun gear and adapted to be selectively fixed by another brake;

a first pinion gear meshing with said first sun gear; a second pinion gear meshing with said first pinion gear and said ring gear;

a second sun gear meshing with said second pinion gear and connected to said assist prime mover; and a carrier holding the individual pinion gears in a manner to rotate on their axes and to revolve therearound and connected to said output member.

41. A control device of a hybrid drive unit, wherein an assist prime mover is connected through a transmission to an output member, to which a torque outputted by a main prime mover is transmitted, comprising:

a first torque corrector for correcting the torque to be transmitted from said main prime mover to said output member during a gear shift by said transmission, wherein said main prime mover includes an internal combustion engine, to which the torque is synthesized or distributed through a gear mechanism for performing a differential action with three rotary elements; and a first motor generator;

said assist prime mover is constructed of a second motor generator; and said first torque corrector includes a corrector for correcting the torque by said first motor generator.

42. A control device of a hybrid drive unit, wherein an assist prime mover is connected through a transmission to an output member, to which a torque outputted by a main prime mover is transmitted, comprising:

an assist torque corrector for correcting the torque of said assist prime mover in a direction to suppress the change in the torque of said output member, at the gear shift by said transmission, wherein said assist prime mover is constructed by a motor generator.

43. A control device of a hybrid drive unit, which has a main prime mover transmitting a torque thereof to an output member; a transmission transmitting a torque therethrough from an assist prime mover, which is constructed by an electric motor capable of controlling a torque electrically, to the output member, and has a frictional engagement device for setting a gear ratio in accordance with the applied/released state thereof, comprising:

a learning device for learning the relation between the torque capacity and the apply pressure of said frictional engagement device on the basis of the torque generated at said assist prime mover and the apply pressure of said frictional engagement device; and a shift controller for controlling the gear shift of said transmission on the basis of the learned result by said learning device.

44. A control method of a hybrid drive unit, wherein an assist prime mover is connected through a transmission to an output member, to which a torque outputted by a main prime mover is transmitted, comprising:

a first torque correcting step of correcting the torque to be transmitted from said main prime mover to said output member during a gear shift by said transmission, wherein said main prime mover includes an internal combustion engine, to which the torque is synthesized or distributed through a gear mechanism for performing a differential action with three rotary elements; and a first motor generator;

said assist prime mover is constructed of a second motor generator; and said first torque correcting step includes a correcting means for correcting the torque by said first motor generator.

45. A control method of a hybrid drive unit, wherein an assist prime mover is connected through a transmission to an output member, to which a torque outputted by a main prime mover is transmitted, comprising:

an assist torque correcting step of correcting the torque of said assist prime mover in a direction to suppress the change in the torque of said output member, at the gear shift by said transmission, wherein said assist prime mover is constructed by a motor generator.

46. A control method of a hybrid drive unit, which has a main prime mover transmitting a torque thereof to an output member; a transmission transmitting a torque therethrough from an assist prime mover, which is constructed by an electric motor capable of controlling a torque electrically, to the output member, and has a frictional engagement device for setting a gear ratio in accordance with the applied/released state thereof, comprising:

a learning step of learning the relation between the torque capacity and the apply pressure of said frictional engagement device on the basis of the torque generated at said assist prime mover and the apply pressure of said frictional engagement device; and a shift controlling step of controlling the gear shift of said transmission on the basis of the learned result of said learning step.

* * * * *